United States Patent
Dabel et al.

(10) Patent No.: US 10,814,791 B2
(45) Date of Patent: Oct. 27, 2020

(54) MODULAR RAIL AND ACCESSORY SYSTEM

(71) Applicant: Volvo Truck Corporation, Gothenburg (SE)

(72) Inventors: Jason Dabel, Greensboro, NC (US); Yuyol Lee, Torrance, CA (US); Brian Balicki, Kernersville, NC (US); Geoffrey Horn, Greensboro, NC (US)

(73) Assignee: Volvo Truck Corporation, Gothenburg (SE)

( * ) Notice: Subject to any disclaimer, the term of this patent is extended or adjusted under 35 U.S.C. 154(b) by 39 days.

(21) Appl. No.: 16/083,328

(22) PCT Filed: Mar. 31, 2016

(86) PCT No.: PCT/US2016/025149
§ 371 (c)(1),
(2) Date: Sep. 7, 2018

(87) PCT Pub. No.: WO2017/171770
PCT Pub. Date: Oct. 5, 2017

(65) Prior Publication Data
US 2019/0092247 A1    Mar. 28, 2019

(51) Int. Cl.
*B60R 7/08*    (2006.01)
*B60N 3/10*    (2006.01)
(Continued)

(52) U.S. Cl.
CPC ............... *B60R 7/08* (2013.01); *B60N 3/083* (2013.01); *B60N 3/10* (2013.01); *B60N 3/103* (2013.01);
(Continued)

(58) Field of Classification Search
CPC . B60N 3/08; B60N 3/083; B60N 3/10; B60N 3/103; B60N 3/106; B60R 7/08
(Continued)

(56) References Cited

U.S. PATENT DOCUMENTS 3,236,975 A    2/1966  De Smidt et al.
4,869,378 A *  9/1989  Miller .................. A47F 5/0853
                                                     211/94.01
(Continued)

FOREIGN PATENT DOCUMENTS

DE      10236072 A1 *   2/2004  ............. B60R 7/046
DE    102005035038 A1 *  2/2007  ............... B60R 7/08
(Continued)

OTHER PUBLICATIONS

English translation of DE 10 2010 025 876; retreived via Patent-Translate located at www.epo.org. (Year: 2019).*
(Continued)

*Primary Examiner* — Jason S Daniels
(74) *Attorney, Agent, or Firm* — Withrow & Terranova, PLLC

(57) ABSTRACT

An accessory attachment system includes a channel element arranged to receive one or more repositionable accessories. A pivotally mounted spring-based clasp with a hook element engages a lower lip of the channel element. Restraint cooperating elements such as protrusions or recesses of an accessory are configured to cooperate with laterally spaced accessory motion restraints such as recesses or protrusions of the channel element to inhibit lateral movement and rotation of an accessory body. An accessory including laterally spaced restraint cooperating elements and a pivotally mounted spring-biased clasp, as well as an attachment method, are further provided.

22 Claims, 31 Drawing Sheets

(51) Int. Cl.
    *B60N 3/08*     (2006.01)
    *B60R 11/00*     (2006.01)

(52) U.S. Cl.
    CPC ....... *B60R 11/00* (2013.01); *B60R 2011/0071* (2013.01); *B60R 2011/0073* (2013.01)

(58) Field of Classification Search
    USPC ................................ 296/3, 37.8, 37.9, 37.13
    See application file for complete search history.

(56) References Cited

U.S. PATENT DOCUMENTS

| | | |
|---|---|---|
| 5,180,089 A | 1/1993 | Suman et al. |
| 7,152,897 B2 | 12/2006 | Bonnes et al. |
| 7,537,258 B2 | 5/2009 | Quijano et al. |
| 8,382,183 B2 | 2/2013 | Vander Sluis et al. |
| 2002/0092956 A1 | 7/2002 | Conway et al. |
| 2003/0019775 A1 | 1/2003 | Ernst |
| 2006/0186155 A1 | 8/2006 | Quijano et al. |
| 2007/0262218 A1 | 11/2007 | Rosemann et al. |
| 2008/0105802 A1* | 5/2008 | Kirtland ................... B60R 7/08 248/207 |
| 2011/0109129 A1* | 5/2011 | Brill ....................... B60N 3/004 297/188.04 |
| 2012/0299338 A1 | 11/2012 | Hanson et al. |

FOREIGN PATENT DOCUMENTS

| | | | |
|---|---|---|---|
| DE | 102006045323 A1 * | 4/2008 | ............. B06R 11/00 |
| DE | 102010025876 A1 | 5/2011 | |
| DE | 102012011846 A1 | 12/2013 | |
| FR | 2753663 B1 | 12/1998 | |

OTHER PUBLICATIONS

Extended European Search Report for European Patent Application No. 16897319.6, dated Sep. 11, 2019, 9 pages.

International Search Report and Written Opinion for International Patent Application No. PCT/US2016/025149, dated Jul. 1, 2016, 9 pages.

* cited by examiner

FIG._3

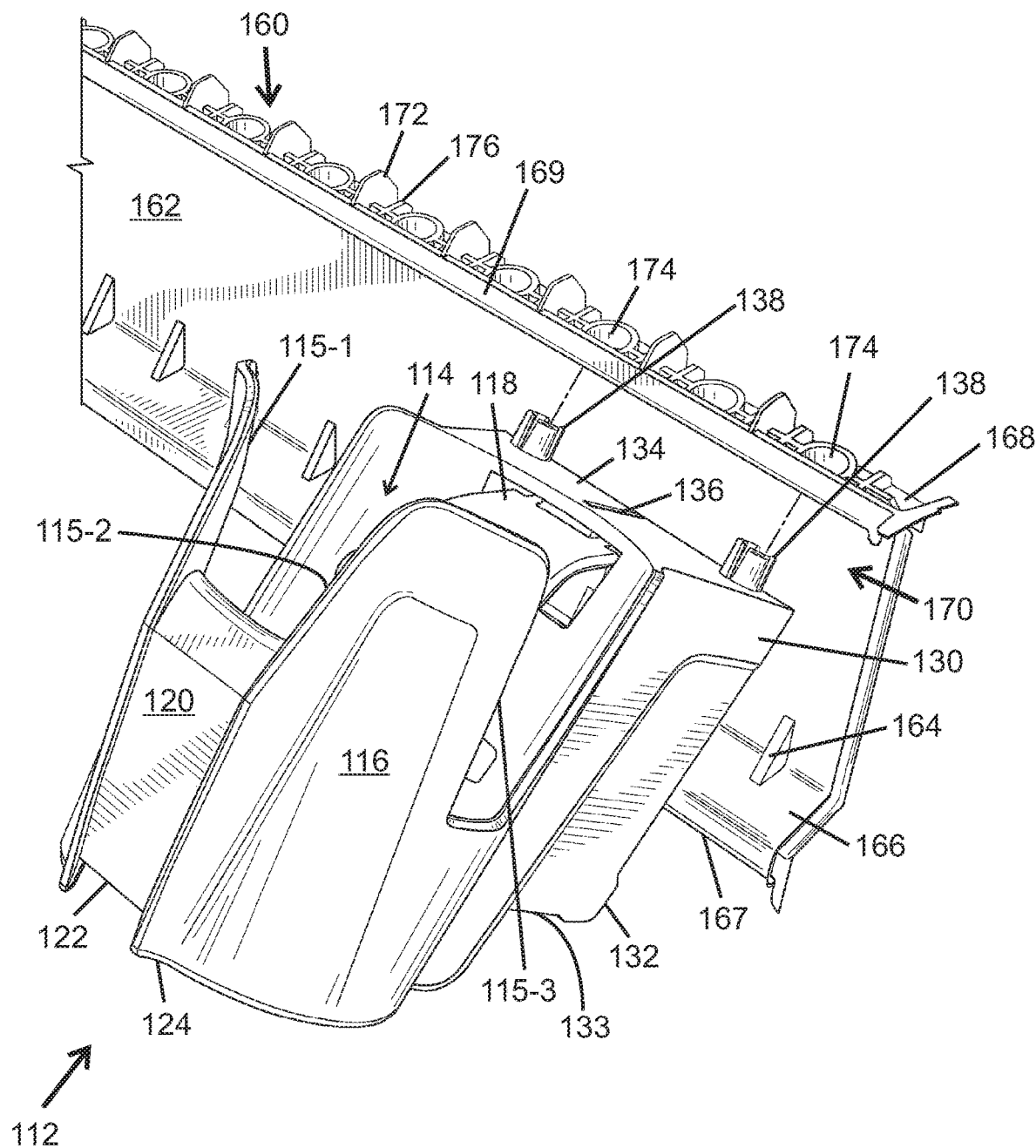
FIG._6A

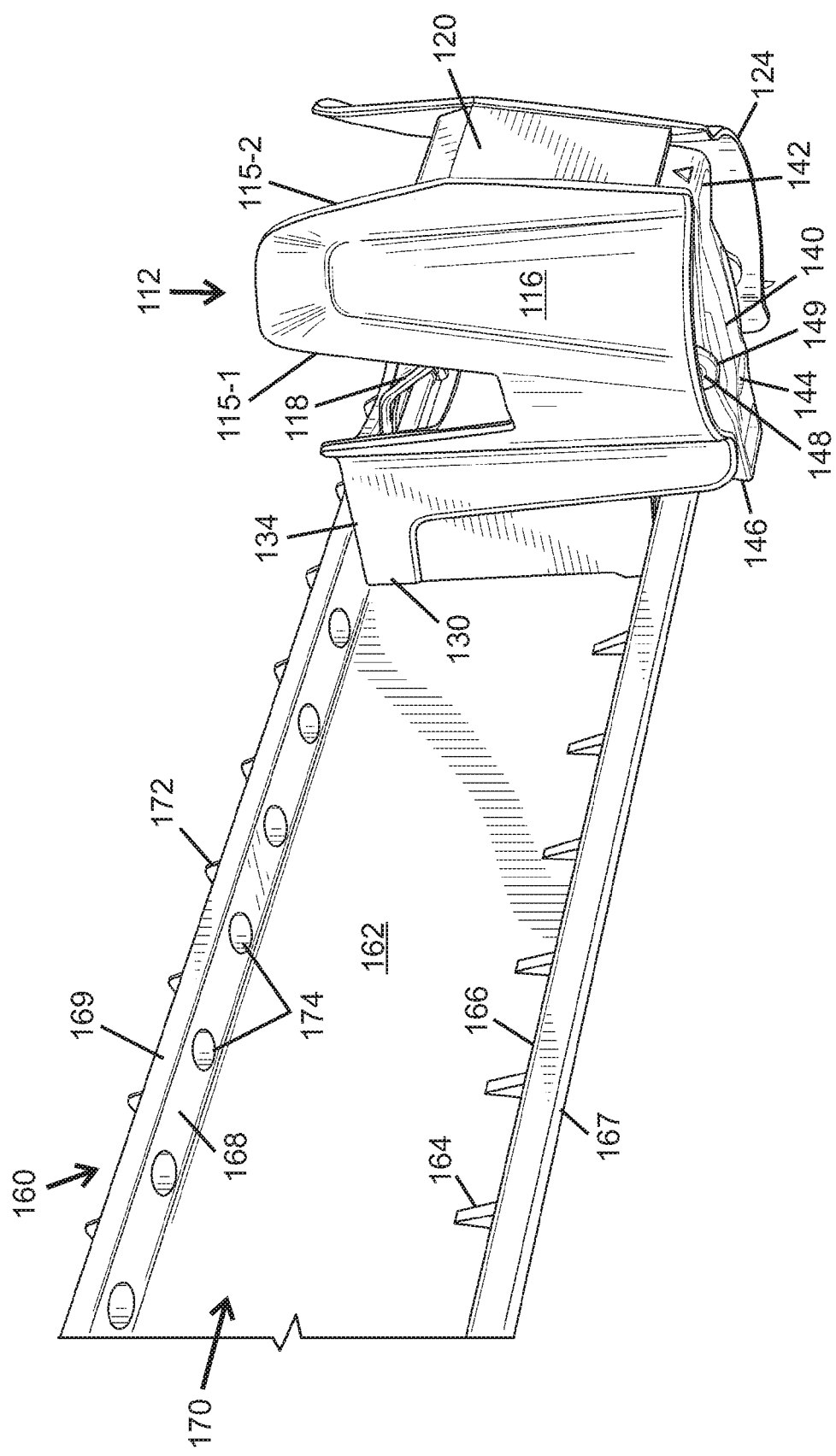
FIG._6C

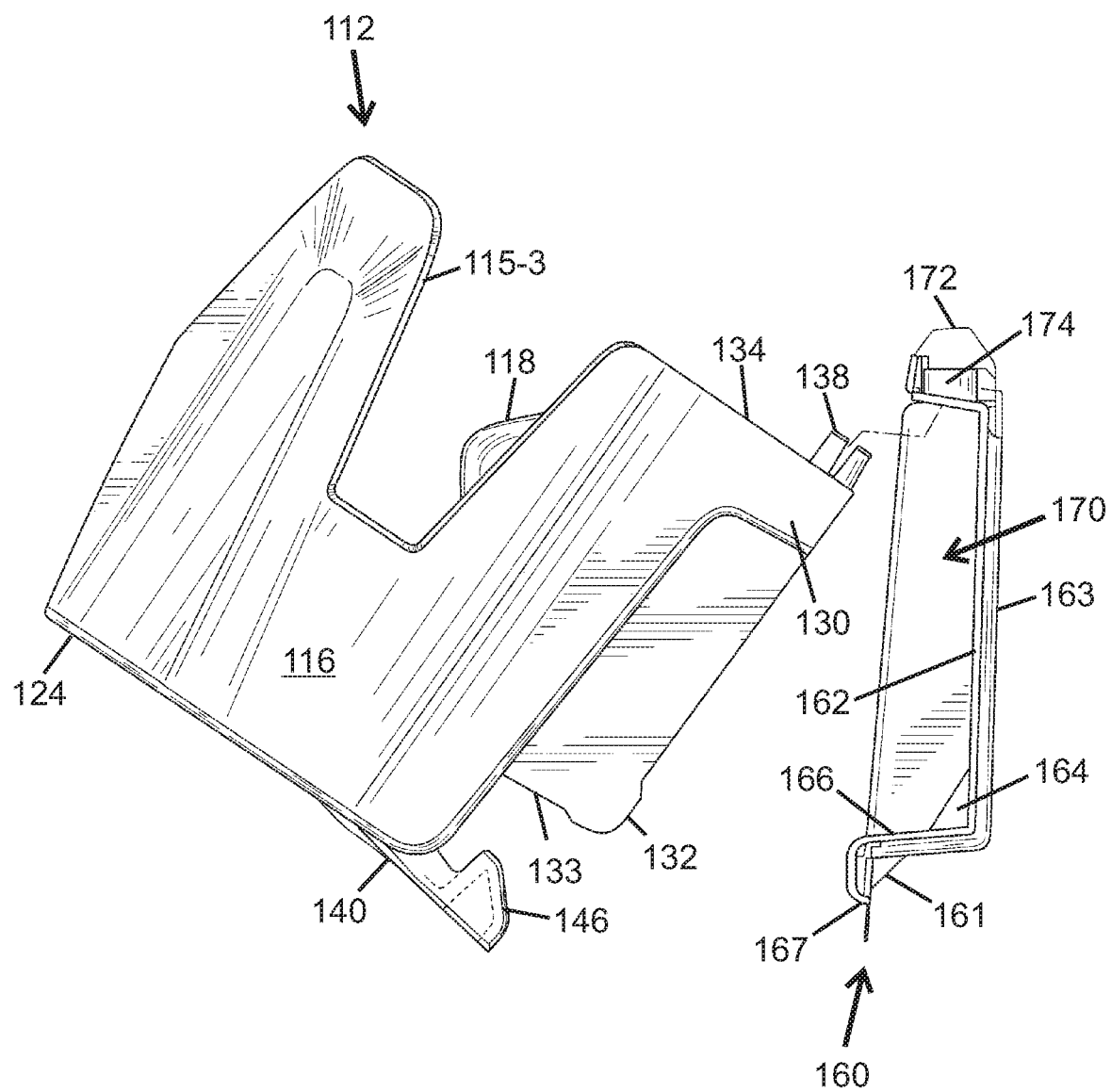
FIG._7A

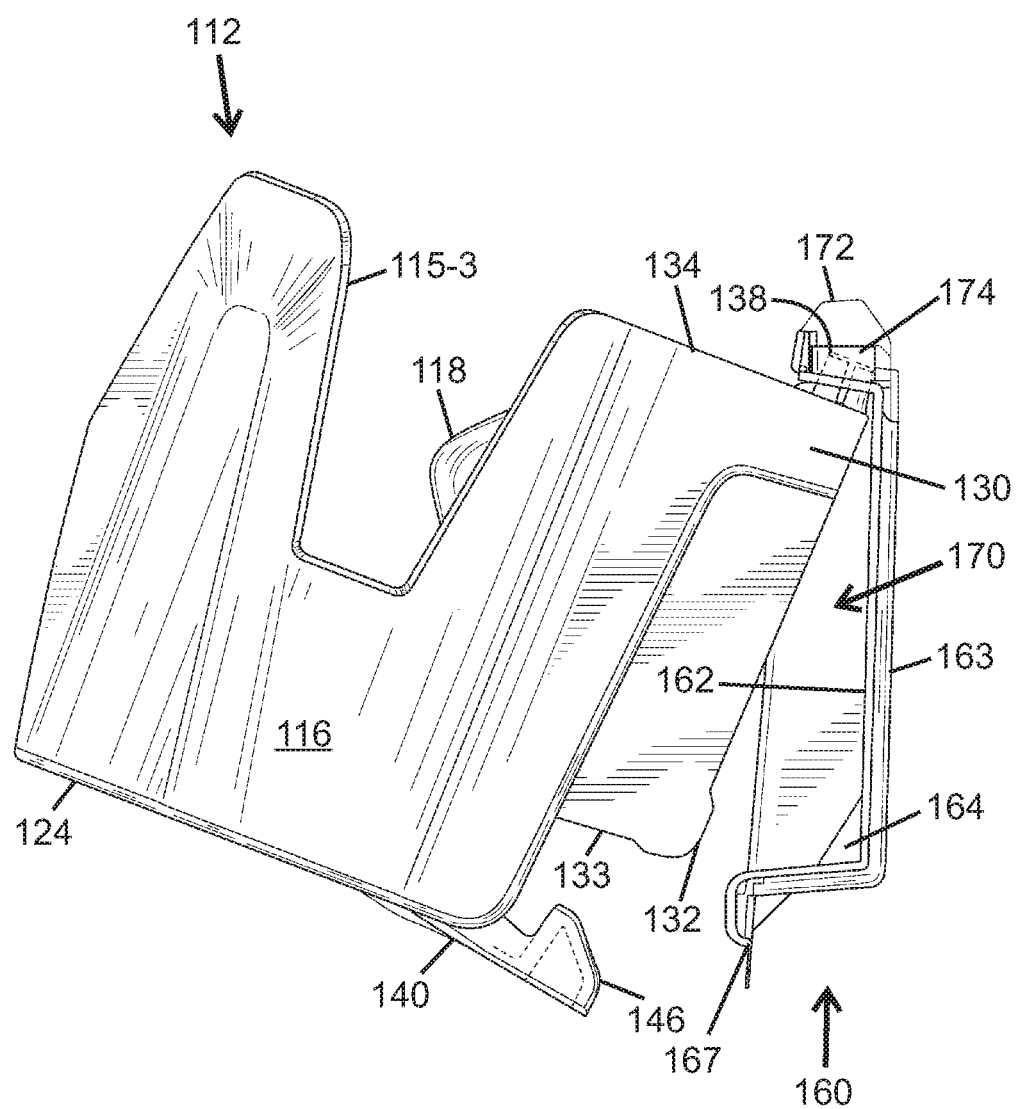
FIG._7B

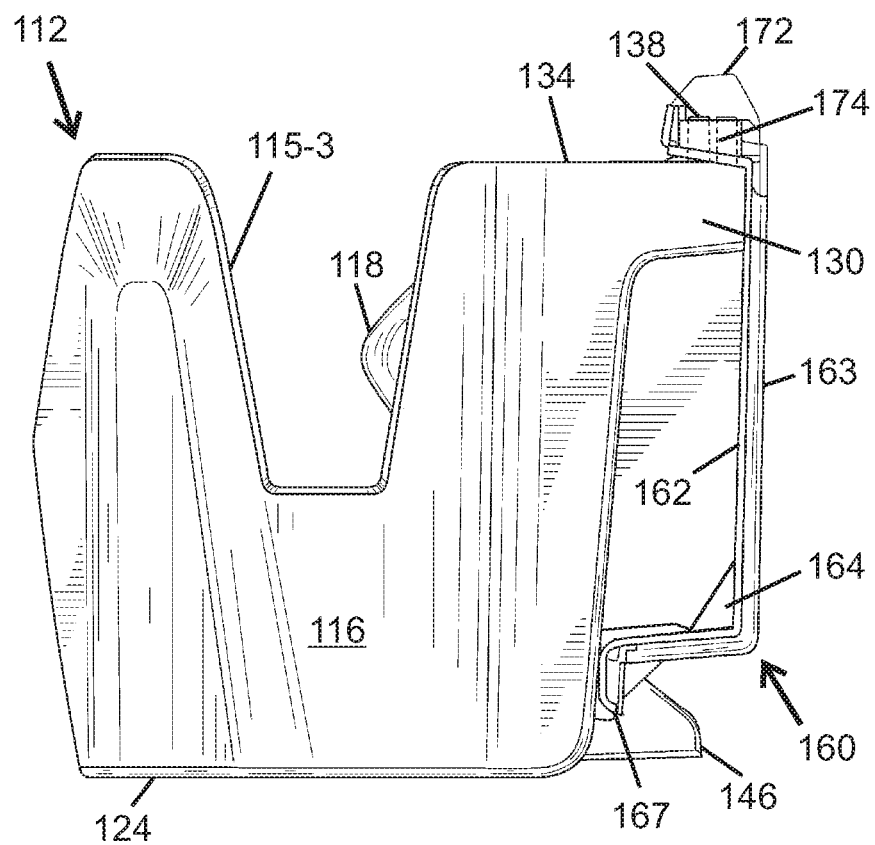
FIG._7C

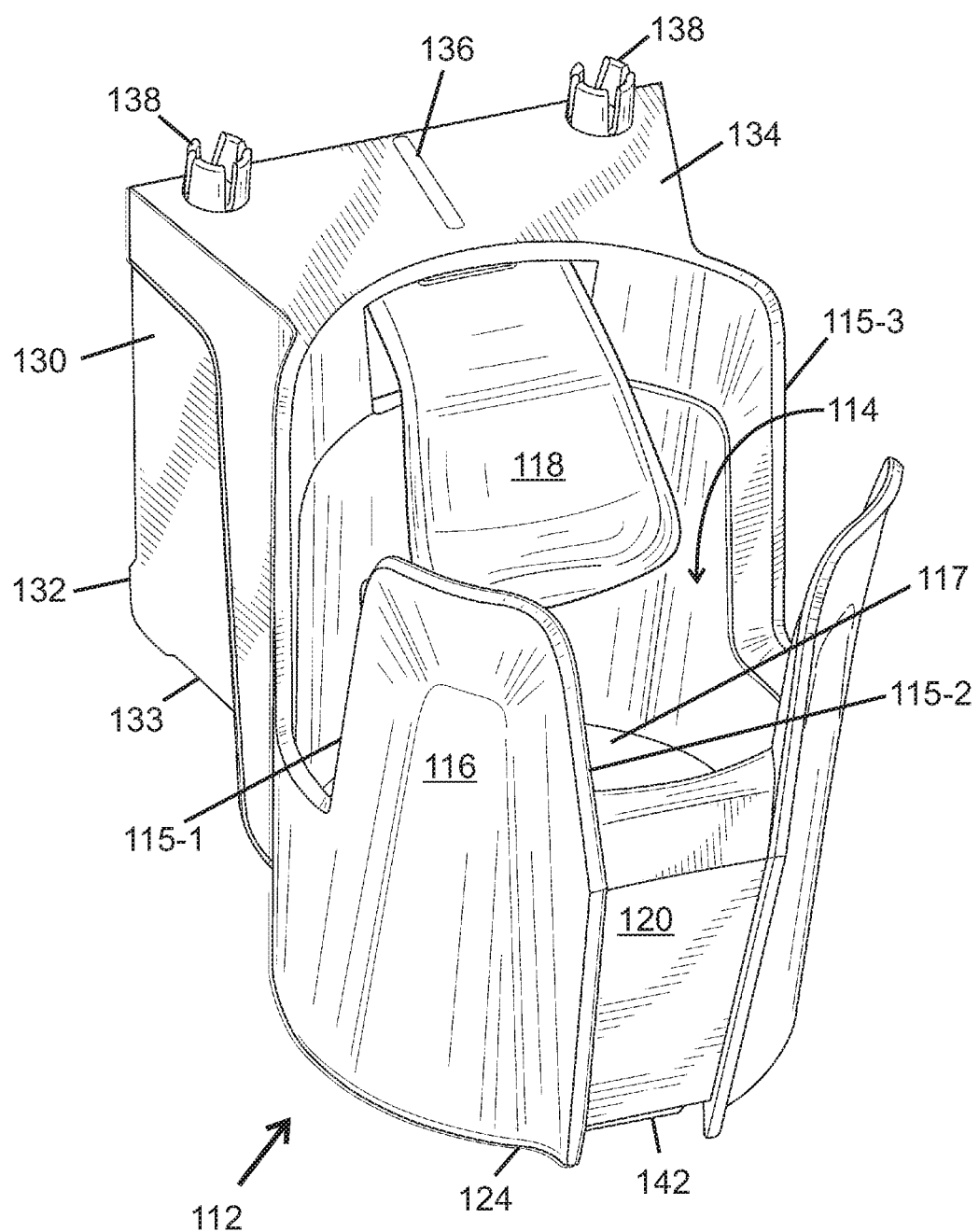
FIG._8

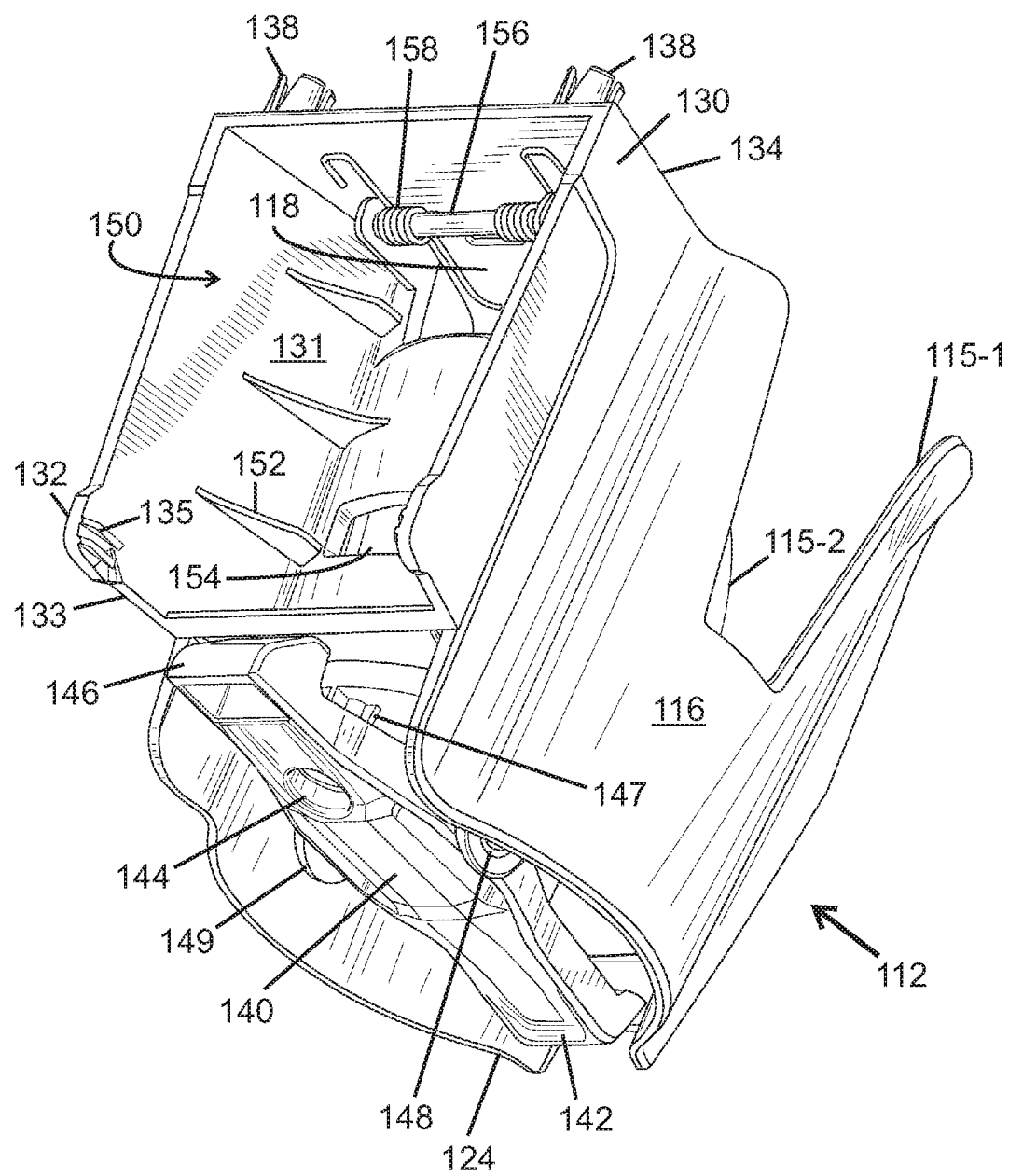
FIG._9

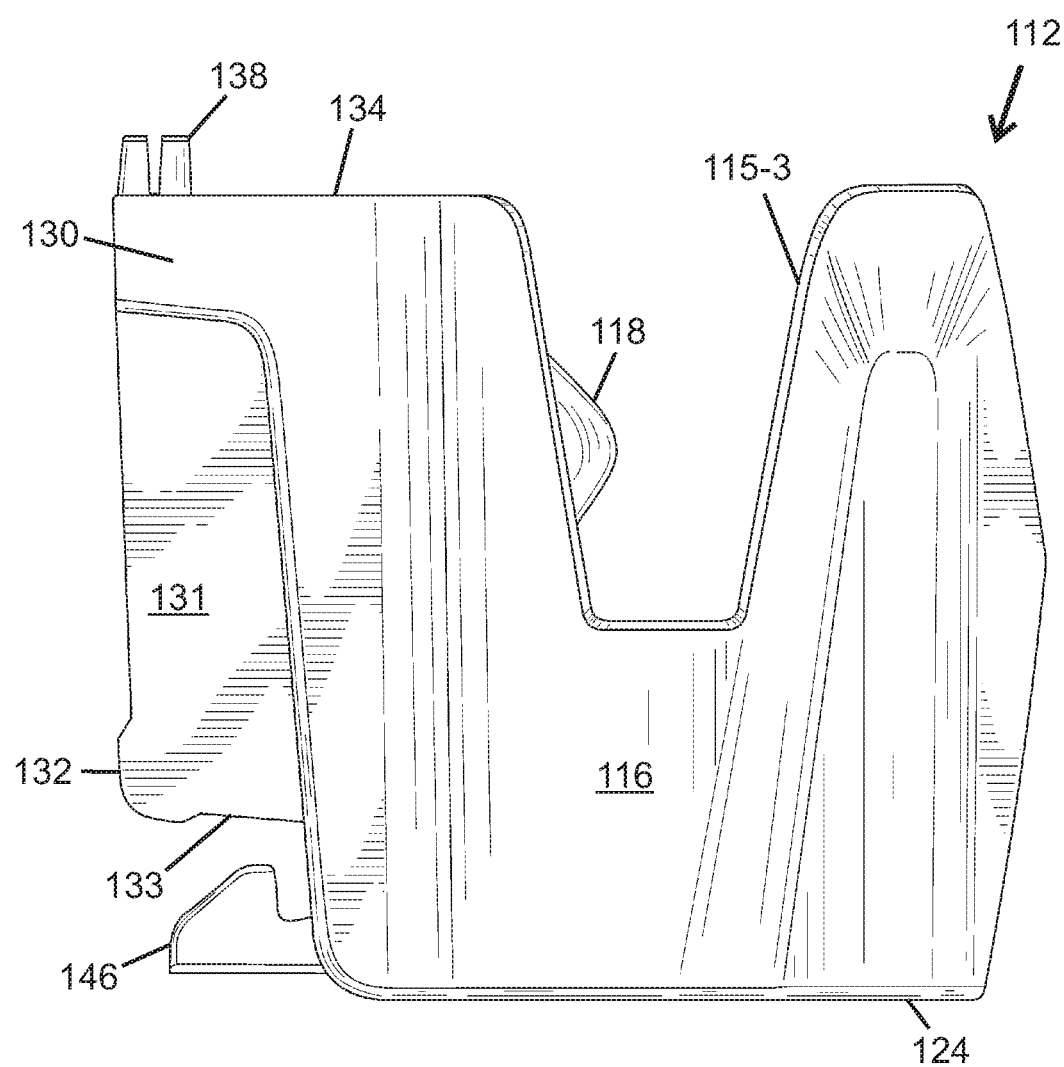
FIG._11

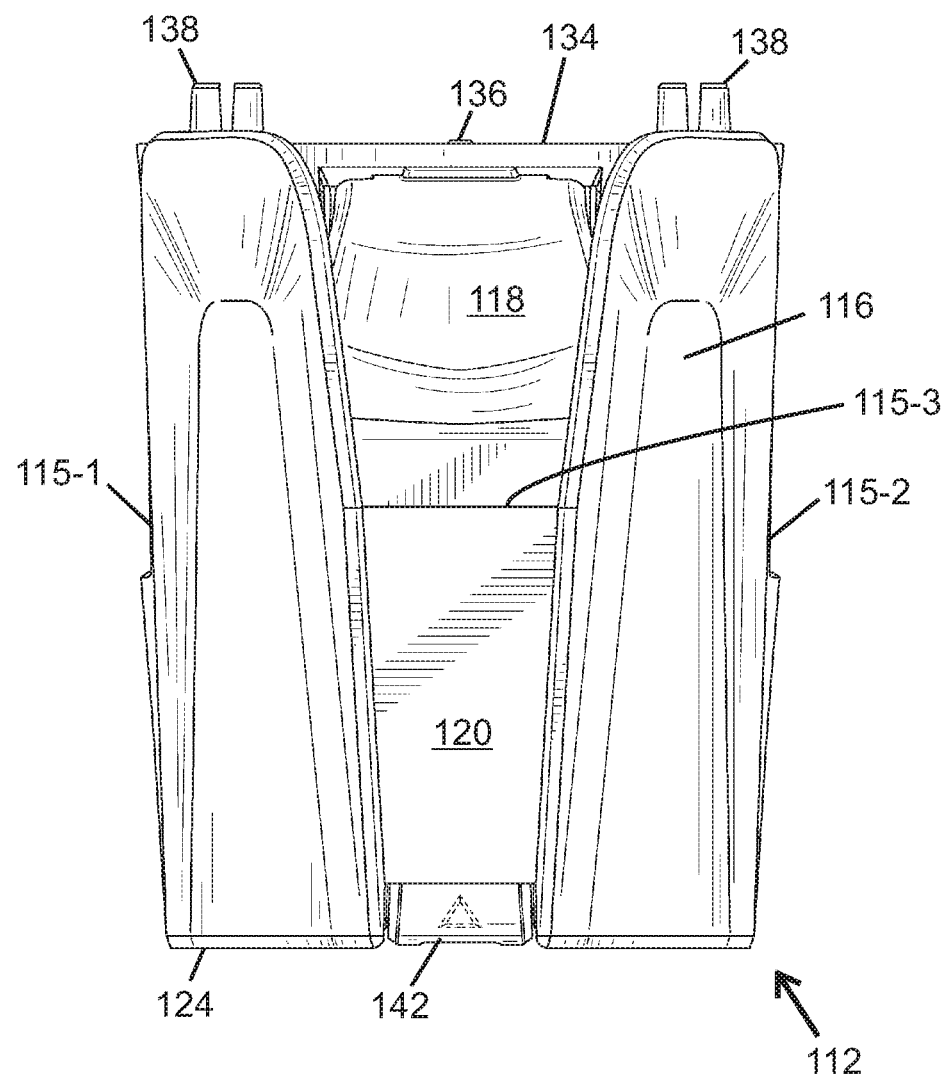
FIG._12

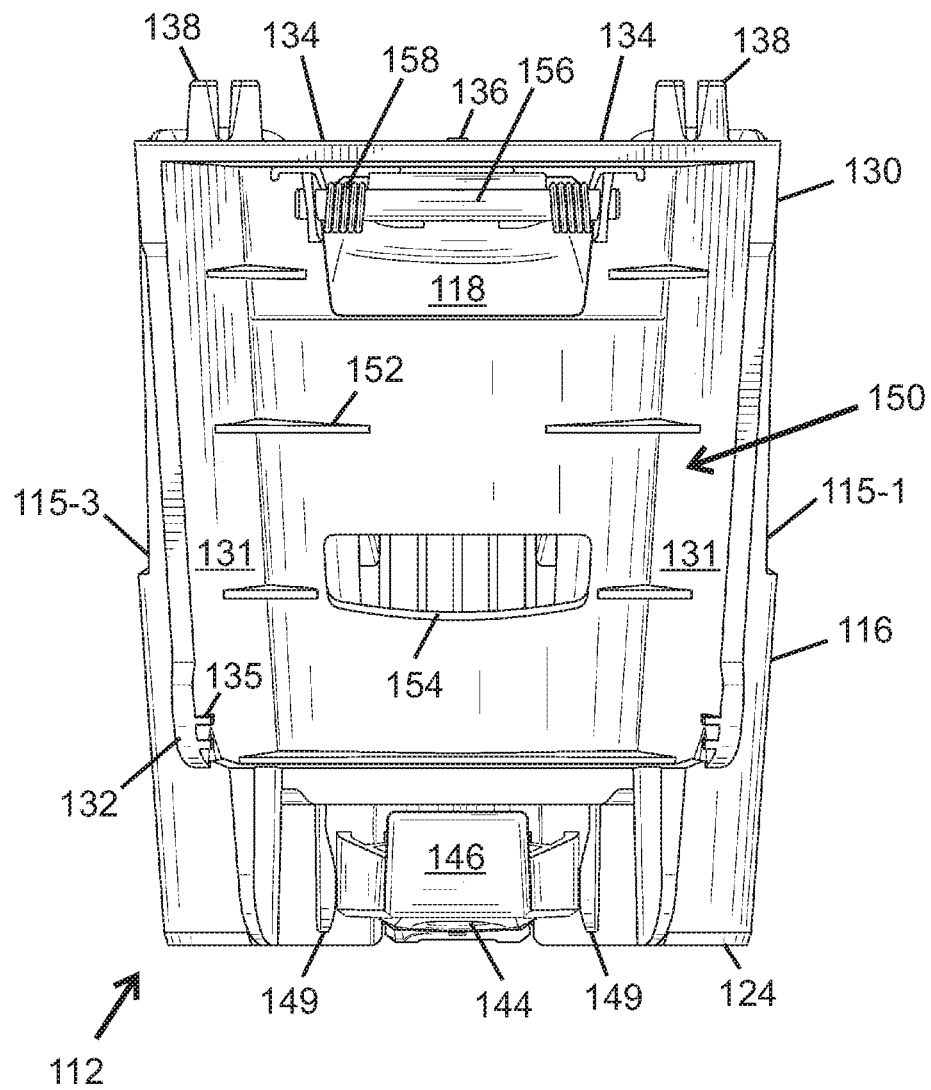
FIG._13

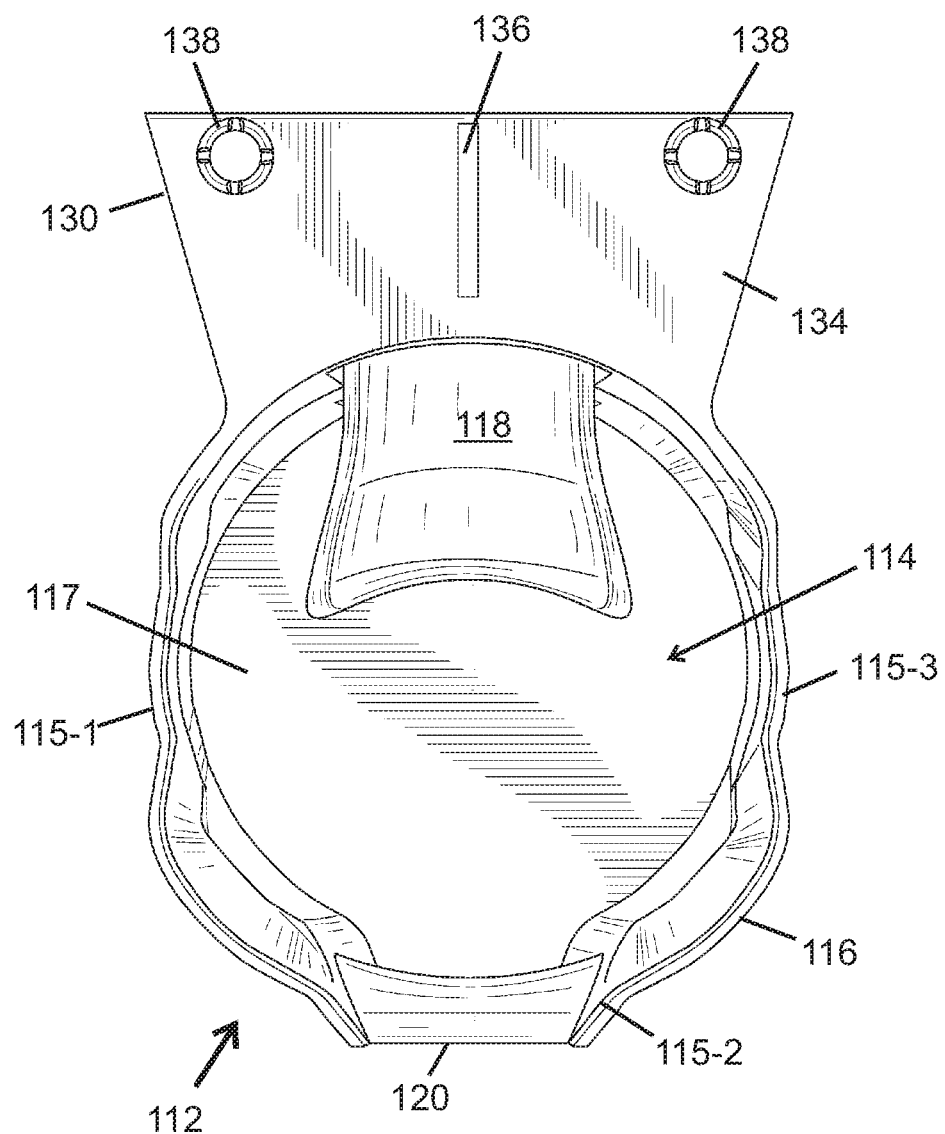
FIG._14

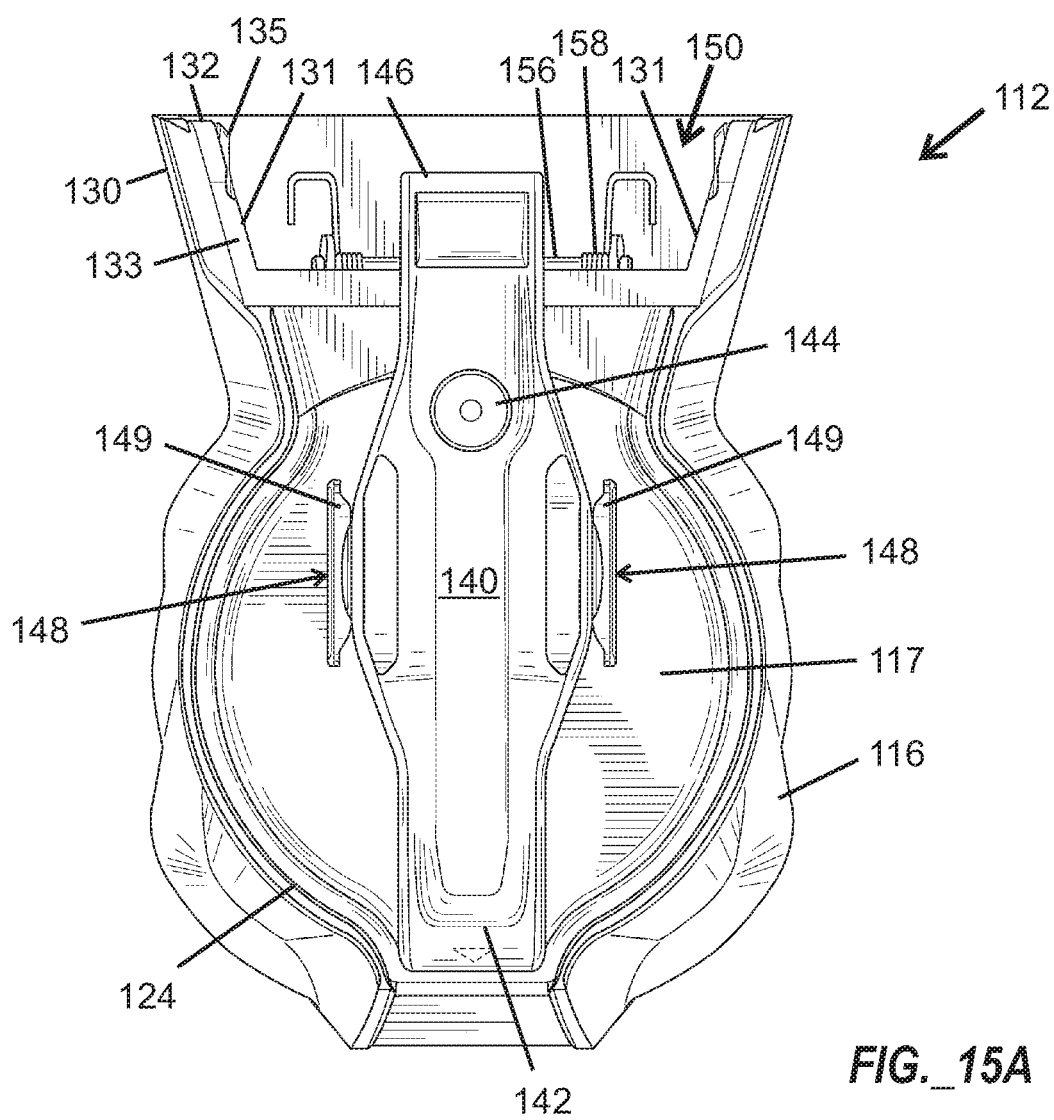
FIG._15A
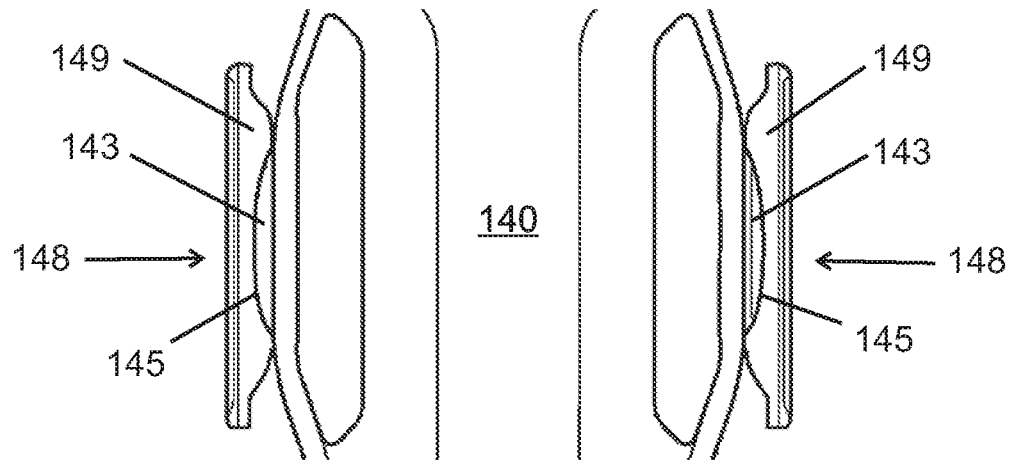
FIG._15B

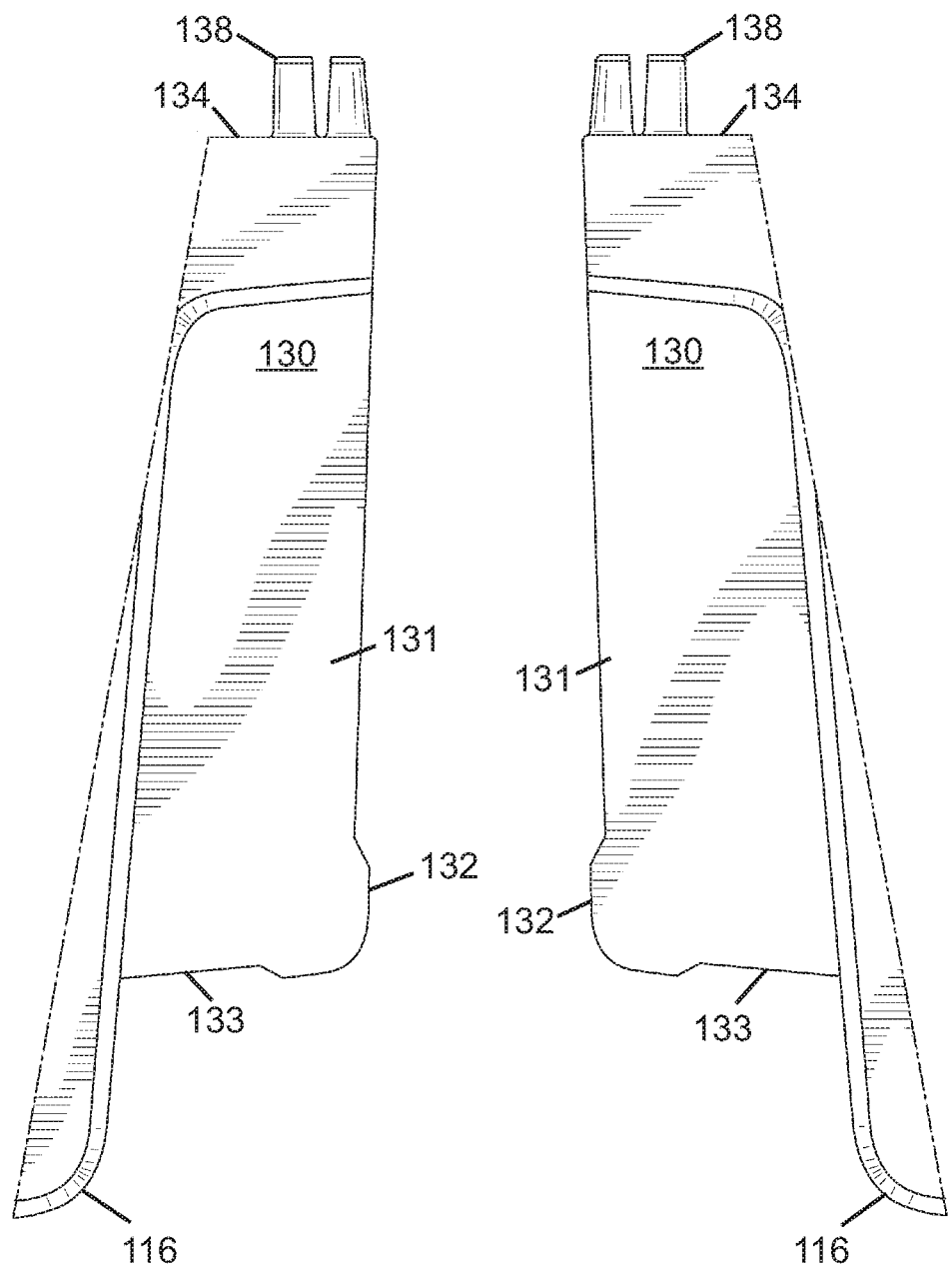
FIG._17   FIG._18

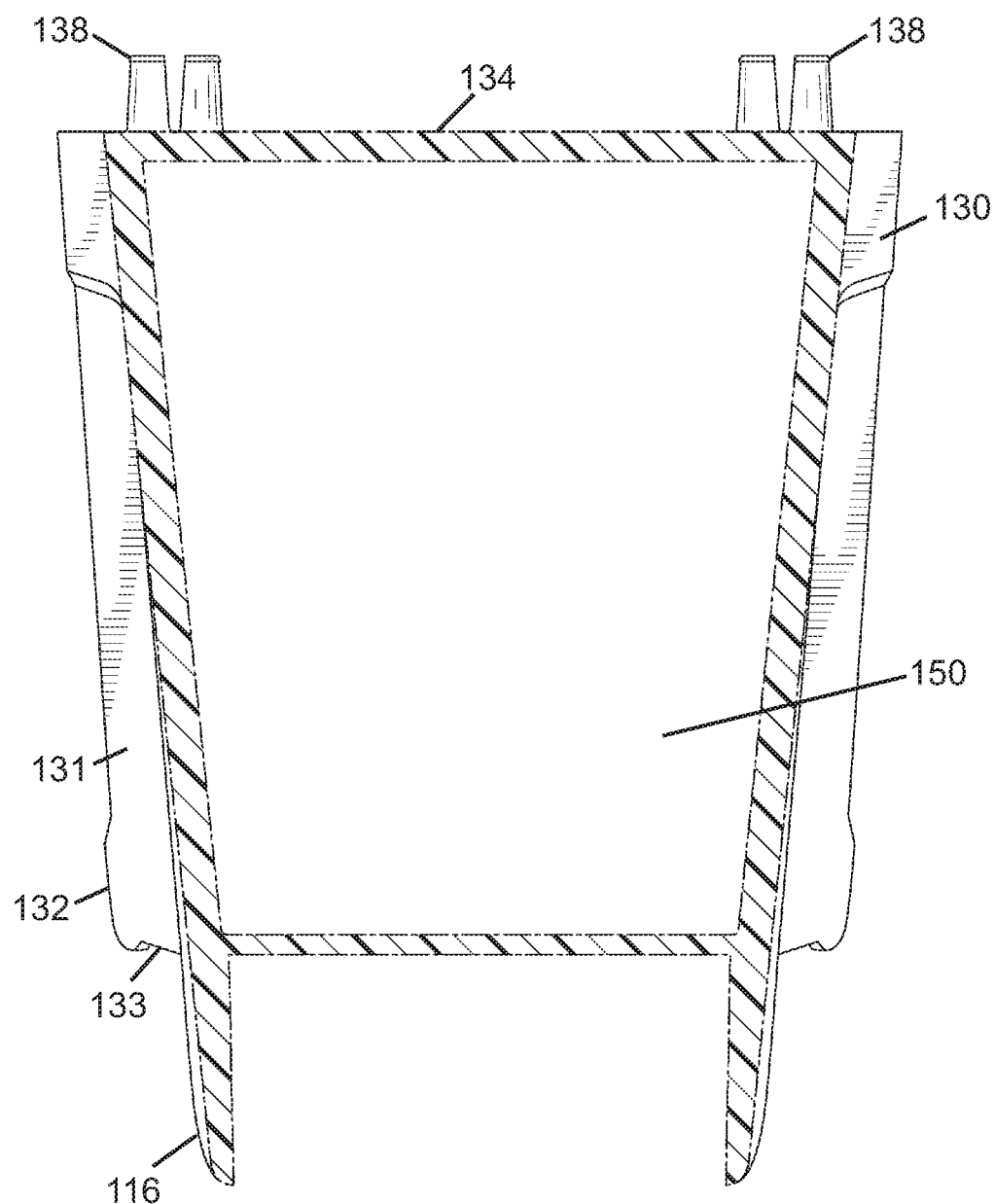
FIG._19

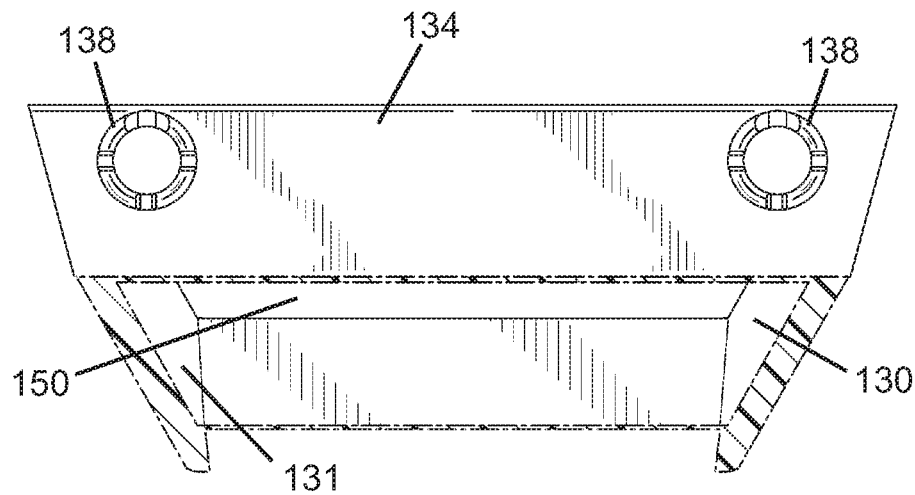
FIG._21
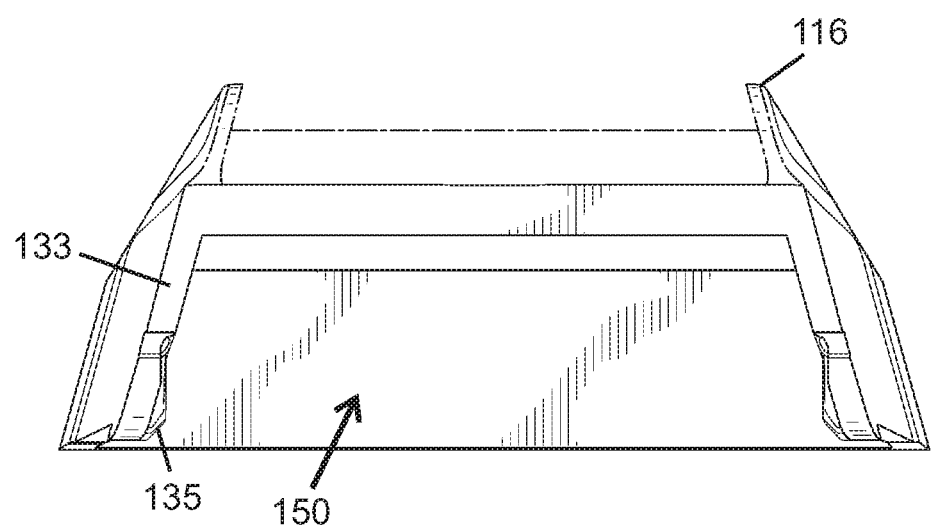
FIG._22

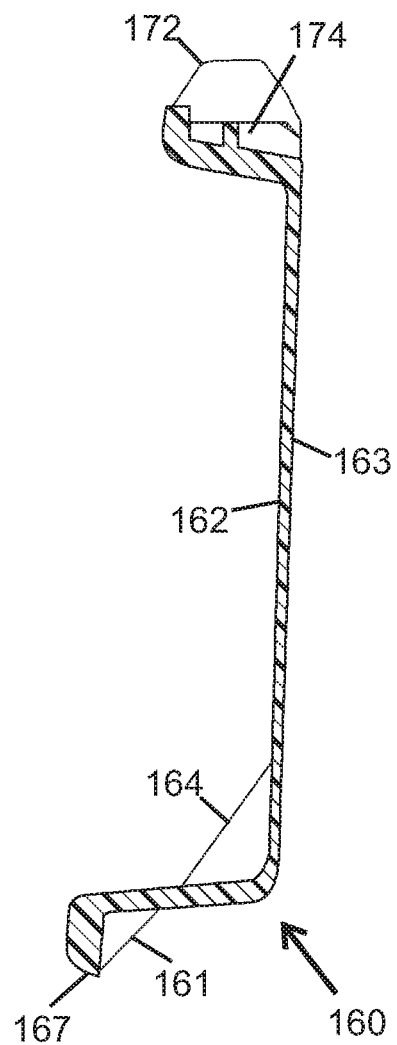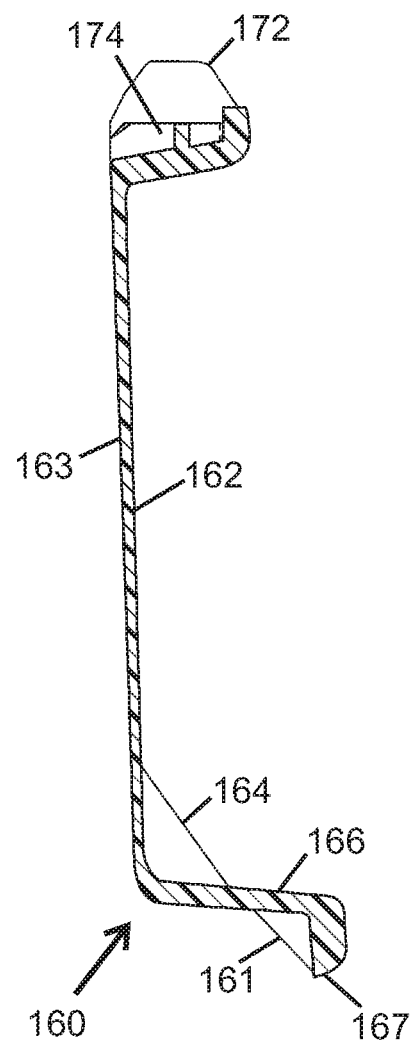
FIG._27  FIG._28

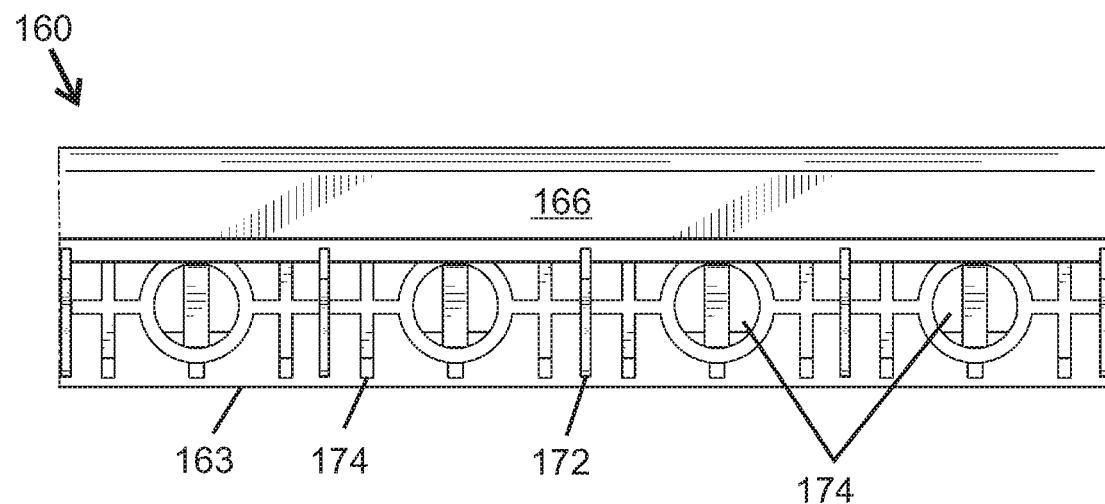
FIG._29
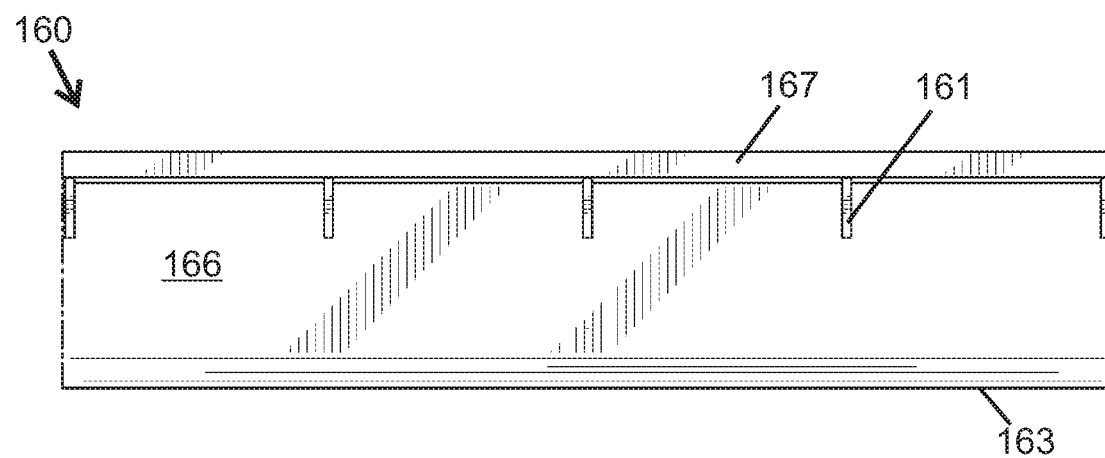
FIG._30

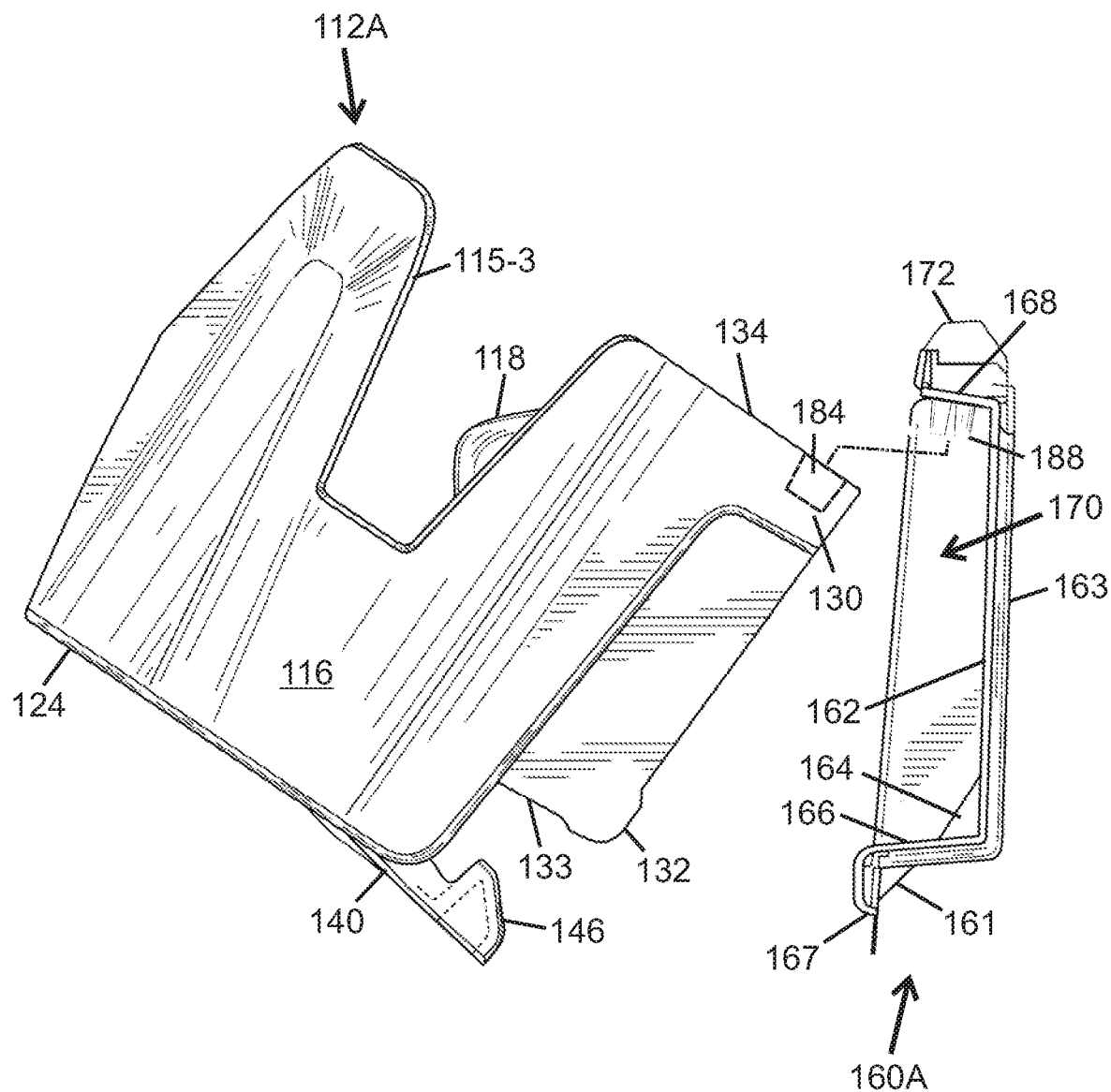
FIG._31

MODULAR RAIL AND ACCESSORY SYSTEM

This application is a 35 U.S.C. § 371 national phase filing of International Application No. PCT/US2016/025149, filed Mar. 31, 2016, the disclosure of which is incorporated herein by reference in its entirety.

FIELD OF THE DISCLOSURE

The present disclosure relates generally to vehicle accessories, and more particularly to a system for removable and/or repositionable attachment of accessories at different locations within a vehicle.

BACKGROUND

Modern vehicles frequently include features such as integrated cupholders, storage bins, ashtrays, and the like at various locations such as in or on a console, door panel, or armrest. Unfortunately, these pre-integrated items typically offer little flexibility in terms of placement and/or reconfiguration.

Various vehicle accessory mounting systems are known. For example, U.S. Pat. No. 5,180,089 discloses an elongated support member including a curvilinear convex cross-sectional shape with an upper edge lip and being mountable to a vehicle interior panel, in combination with at least one accessory (e.g., a cupholder, a storage compartment, a lamp, or the like) having an attachment member with a convex surface arranged to matingly engage the support member at any position along its length. U.S. Pat. No. 7,537,258 discloses a rail-like elongated fastening element including a curvilinear convex cross-sectional shape with upper and lower shoulders arranged to be gripped from above and below, respectively, by a releasable connector having an upper hook as well as a pivotally mounted, spring-biased lower hook. The connector is repositionable at any location along the elongated fastening element, and defines a generally vertical slot for removably receiving an accessory such as a cupholder, a bud vase, an electric fan, or the like.

One limitation associated with prior vehicle accessory mounting designs including elongated supports with convex cross-sectional shapes is that the corresponding accessory attachment structures necessarily protrude into the passenger compartment, which increases the chance of accessories being inadvertently jarred by users moving in a vehicle interior. Additionally, prior vehicle accessory mounting designs relying on attachment structures being clamped around upper and lower shoulders of a continuous smooth rail may provide limited rigidity and/or limited resistance to sliding or twisting when subjected to forces occasioned by vehicle movement and/or inadvertent jarring by users.

A need exists in the art for improvements in accessory attachment systems for vehicle interiors to overcome limitations of conventional devices.

SUMMARY

The present disclosure is directed to an accessory attachment system and an attachment method, both primarily intended for use within the interior of a motor vehicle. A channel element includes multiple accessory motion restraints as well as a forwardly-extending shelf including a lower lip. An accessory is arranged to be removably attached to, and repositionable on, the channel element. The accessory includes a body with one or more restraint cooperating elements and a pivotally mounted spring-biased clasp including a hook element configured to engage the lower lip when the accessory body is received by the channel element. The one or more restraint cooperating elements of the accessory body are configured to cooperate with one or more accessory motion restraints of the channel element to inhibit lateral movement as well as rotation of the accessory body relative to the channel element. Positioning at least a portion of the accessory body within a channel of the channel element may reduce a distance that the accessory extends into a vehicle passenger compartment. Use of a spring-biased clasp in combination with one or more restraint cooperating elements that engage with one or more accessory motion restraints may provide enhanced rigidity and resistance to sliding and twisting when an accessory is subjected to forces caused by vehicular movement and/or jarring by users. When multiple laterally spaced restraint cooperating elements are used in combination with a spring-biased clasp, the accessory is desirably connected to the channel element at least three points that are not co-linear with one another.

In one aspect, the disclosure relates to an accessory attachment system including a channel element and an accessory. The channel element includes a rear wall, a shelf extending forward relative to the rear wall, a lower lip extending generally downward from a leading edge of the shelf, and a plurality of laterally spaced accessory motion restraints located above the shelf. The accessory is arranged to be repositioned relative to the channel element, and includes an accessory body configured to be received by the channel element. The accessory body includes at least one restraint cooperating element and a pivotally mounted spring-biased clasp including a hook element configured to engage the lower lip when the accessory body is received by the channel element. The at least one restraint cooperating element is configured to cooperate with one or more accessory motion restraints of the plurality of laterally spaced accessory motion restraints to inhibit lateral movement and rotation of the accessory body relative to the channel element when the accessory body is received by the channel element.

In certain embodiments, the channel element includes an upper wall projecting forward from the rear wall, the plurality of laterally spaced accessory motion restraints is defined in or on the upper wall, and the at least one restraint cooperating element is arranged along a top surface of the accessory body. In certain embodiments, the upper wall, the rear wall, and the shelf of the channel element define a generally horizontal, forward-facing channel, and at least a portion of the accessory body is configured to be arranged within the channel when the accessory body is received by the channel element. In certain embodiments, the at least one restraint cooperating element includes multiple laterally spaced restraint cooperating elements arranged to cooperate with multiple accessory motion restraints of the plurality of laterally spaced accessory motion restraints. In certain embodiments, the laterally spaced plurality of accessory motion restraints includes a plurality of apertures or recesses defined in the channel element, and the at least one restraint cooperating element includes multiple laterally spaced protrusions extending from a surface of the accessory body and arranged to be received by multiple apertures or recesses of the plurality of apertures or recesses. In certain embodiments, at least a portion of each protrusion of the multiple laterally spaced protrusions includes a generally conical or frustoconical shape. In certain embodiments, the plurality of laterally spaced accessory motion restraints includes a plurality of protrusions extending from a surface of the channel element, and the at least one restraint cooperating element includes multiple laterally spaced apertures or recesses defined in the accessory body and arranged to receive multiple protrusions of the plurality of protrusions. In certain embodiments, opposing first and second pivot recess elements are arranged along a lower surface of the accessory body, wherein the first and second pivot recess elements are coaxially aligned with a pivot axis of the spring-biased clasp, and the spring-biased clasp includes first and second pivot protrusions received by the first and second pivot recess elements, respectively, to permit pivotal movement of the spring-biased clasp. In certain embodiments, the pivotally mounted spring-biased clasp includes a user-depressible lever actuating surface disposed along a front portion of a lower surface of the accessory. In certain embodiments, the accessory comprises one of the following items: a cupholder, an ashtray, a storage container, a notepad, or a mount for a portable electronic device. In certain embodiments, the channel element is configured to be affixed to or integrated with an interior of a motor vehicle.

In another aspect, the disclosure relates to an accessory configured for repositionable attachment to a channel element that includes a rear wall, a shelf extending forward from the rear wall, a lower lip extending generally downward from a leading edge of the shelf, and a plurality of accessory motion restraints which are laterally spaced in relation to one another and located above the shelf. The accessory includes an accessory body configured to be received by the channel element, wherein the accessory body includes multiple laterally spaced restraint cooperating elements and a pivotally mounted spring-biased clasp having a hook element configured to engage the lower lip when the accessory body is received by the channel element. The multiple laterally spaced restraint cooperating elements are configured to cooperate with multiple accessory motion restraints of the plurality of accessory motion restraints to inhibit lateral movement and rotation of the accessory body relative to the channel element when the accessory body is received by the channel element.

In certain embodiments, the multiple restraint cooperating elements are arranged along a top surface of the accessory body, and the plurality of laterally spaced accessory motion restraints are defined in or on an upper wall projecting forward from the rear wall of the channel element. In certain embodiments, the upper wall, the rear wall, and the shelf of the channel element define a generally horizontal, forward-facing channel, and at least a portion of the accessory body is configured to be arranged within the channel when the accessory body is received by the channel element. In certain embodiments, the plurality of accessory motion restraints includes a plurality of apertures or recesses defined in the channel element, and the multiple laterally spaced restraint cooperating elements include multiple laterally spaced protrusions extending from a surface of the accessory body and arranged to be received by multiple apertures or recesses of the plurality of apertures or recesses. In certain embodiments, at least a portion of each protrusion of the multiple laterally spaced protrusions comprises a generally conical or frustoconical shape. In certain embodiments, the plurality of accessory motion restraints comprises a plurality of protrusions extending from a surface of the channel element, and the multiple laterally spaced restraint cooperating elements comprise multiple apertures or recesses defined in the accessory body and arranged to receive multiple protrusions of the plurality of protrusions.

In another aspect, a method for removably attaching an accessory to a channel element is provided. The channel element includes a rear wall, a shelf extending forward relative to the rear wall, a lower lip extending generally downward from a leading edge of the shelf, and a plurality of laterally spaced accessory motion restraints which are laterally spaced in relation to one another and located above the shelf. The accessory includes multiple laterally spaced restraint cooperating elements, an accessory body, and a pivotally mounted spring-biased clasp including a hook element. The method includes actuating the pivotally mounted spring-biased clasp to expand a gap between the hook element and the accessory body; tilting an upper portion of the accessory body forward and registering the multiple laterally spaced restraint cooperating elements with multiple accessory motion restraints of the plurality of laterally spaced accessory motion restraints; and tilting a lower portion of the accessory body forward to cause the hook element to engage the lower lip and to cause the multiple laterally spaced restraint cooperating elements to engage the multiple accessory motion restraints. In certain embodiments, the channel element includes an upper wall projecting forward from the rear wall; the upper wall, the rear wall, and the shelf of the channel element define a generally horizontal, forward-facing channel; and said forward tilting of the lower portion of the accessory body causes at least a portion of the accessory body to be arranged within the forward-facing channel with a surface of the accessory body in contact with the rear wall. In certain embodiments, the plurality of laterally spaced accessory motion restraints is defined in or on the upper wall, and the multiple laterally spaced restraint cooperating elements are arranged along a top surface of the accessory body.

In another aspect, any of the foregoing aspects, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawings.

BRIEF DESCRIPTION OF THE DRAWINGS

FIG. 6A is an upper perspective view of a cupholder accessory arranged in a pre-mounting position proximate to a channel element of an accessory attachment system according to an embodiment of the present disclosure, with the cupholder accessory including a body with multiple restraint cooperating elements configured to cooperate with accessory motion restraints of the channel element.

FIG. 6C is a lower perspective view of the cupholder accessory and the channel element of FIGS. 6A and 6B, with the cupholder accessory received by the channel element and with the cupholder accessory in a post-mounting position.

FIG. 7A is a side elevation view of the cupholder accessory and the channel element of FIGS. 6A-6C, with the cupholder accessory arranged in a pre-mounting position.

FIG. 7B is a side elevation view of the cupholder accessory and the channel element of FIGS. 6A-7A, with the cupholder accessory arranged in a partially mounted position relative to the channel element.

FIG. 7C is a side elevation view of the cupholder accessory and the channel element of FIGS. 6A-7B, with the cupholder accessory received by the channel element and with the cupholder accessory in a post-mounting position.

FIG. 8 is an upper front perspective view of a cupholder accessory suitable for use with a channel element of an accessory attachment system according to an embodiment of the present disclosure, with the cupholder accessory including a body with multiple restraint cooperating elements.

FIG. 9 is a lower rear perspective view of the cupholder accessory of FIG. 8.

FIG. 11 is a left side elevation view of the cupholder accessory of FIGS. 8-10.

FIG. 12 is a front elevation view of the cupholder accessory of FIGS. 8-11.

FIG. 13 is a rear elevation view of the cupholder accessory of FIGS. 8-12.

FIG. 14 is a top plan view of the cupholder accessory of FIGS. 8-13.

FIG. 15A is a bottom plan view of the cupholder accessory of FIGS. 8-14.

FIG. 15B is a magnified bottom plan view of a portion of the cupholder accessory illustrated in FIG. 15A.

FIG. 17 is a right side elevation view of the accessory rear body portion of FIG. 16.

FIG. 18 is a left side elevation view of the accessory rear body portion of FIGS. 16 and 17.

FIG. 19 is a front elevation view of the accessory rear body portion of FIGS. 16-18.

FIG. 21 is a top plan view of the accessory rear body portion of FIGS. 16-20.

FIG. 22 is a bottom plan view of the accessory rear body portion of FIGS. 16-21.

FIG. 27 is right side elevation view of the channel element segment of FIGS. 24-26.

FIG. 28 is a left side elevation view of the channel element segment of FIGS. 24-27.

FIG. 29 is a top plan view of the channel element segment of FIGS. 24-28.

FIG. 30 is a bottom plan view of the channel element segment of FIGS. 24-29.

FIG. 31 is a side elevation view of a cupholder accessory arranged in a pre-mounting position relative to a channel element according to another embodiment, with the channel element including accessory motion restraints embodied in downwardly extending protrusions, and the cupholder accessory including restraint cooperating elements embodied in recesses defined in a top surface of a body structure.

DETAILED DESCRIPTION

Figure 1:
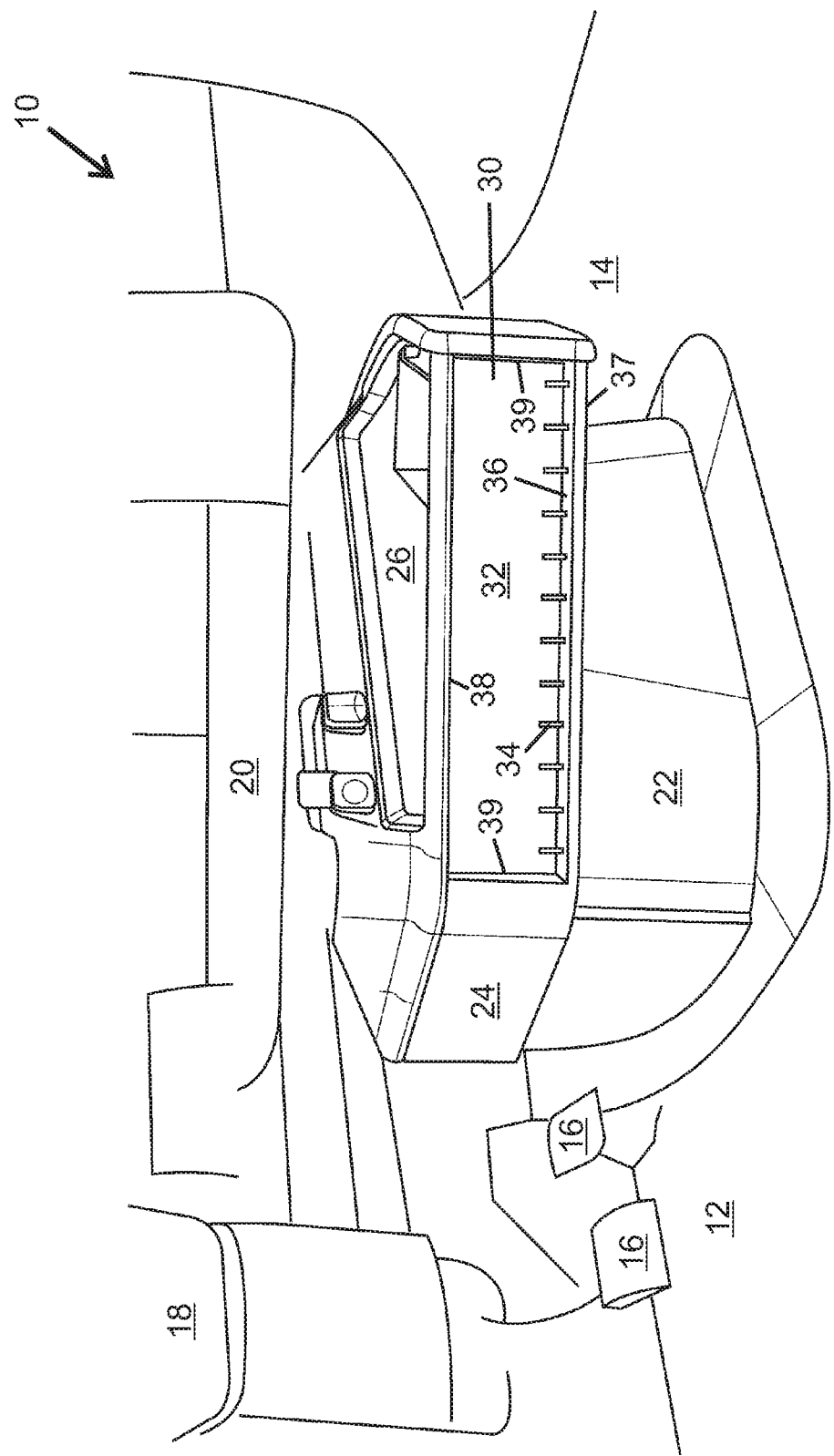
FIG. 1 is a perspective view of a portion of a vehicle interior including a channel element of an accessory attachment system according to one embodiment of the present disclosure.

The present disclosure is directed to an accessory attachment system and an attachment method, both primarily intended for use within the interior of a motor vehicle. The attachment system includes a channel element arranged to removably receive at least one accessory (or multiple accessories) that can be selectively repositioned. The channel element includes multiple laterally spaced accessory motion restraints as well as a forwardly-extending shelf including a lower lip. The accessory includes a body with one or more restraint cooperating elements and a pivotally mounted spring-biased clasp. The clasp includes a hook element configured to engage the lower lip when the accessory body (or at least a portion thereof) is received by the channel element. One or more restraint cooperating elements of the accessory body are configured to engage with one or more accessory motion restraints of the channel element. Such engagement preferably inhibits lateral movement as well as rotation (e.g., lateral rotation) of the accessory body relative to the channel element. Use of a channel element defining a channel arranged to receive at least a portion of the accessory body may reduce a distance that the accessory extends into a vehicle passenger compartment, and thereby reduce the potential for the accessory to be jostled by a user and/or for the accessory to interfere with movement of a user within the passenger compartment. Use of a spring-biased clasp in combination with one or more restraint cooperating elements that engage with one or more accessory motion restraints may provide enhanced rigidity and resistance to sliding and twisting when an accessory is subjected to forces caused by vehicular movement and/or jarring by users. Various types of accessories are contemplated, including (but not limited to) cupholders, ashtrays, storage containers, cooler boxes, notepads, and mounts for portable electronic devices.

In certain embodiments, a plurality of laterally spaced accessory motion restraints includes a plurality of apertures or recesses defined in a wall (e.g., an upper wall and/or a rear wall) of a channel element, with the apertures or recesses being arranged to receive one or more restraint cooperating elements embodied in protrusions extending from a body of an accessory. In certain embodiments, an accessory includes multiple laterally spaced restraint cooperating elements embodied in multiple protrusions extending from an accessory body arranged to cooperate with multiple apertures or recesses defined in the channel element. In other embodiments, a plurality of laterally spaced accessory motion restraints includes a plurality of protrusions extending from a wall (e.g., an upper wall and/or a rear wall) of a channel element, with the protrusions arranged to be received by multiple apertures or recesses defined in a body of an accessory. In certain embodiments, multiple laterally spaced restraint cooperating elements embodied in multiple apertures or recesses defined in an accessory body are arranged to cooperate with multiple protrusions extending from a portion (e.g., an upper wall and/or a rear wall) of a channel element. The presence of multiple laterally spaced restraint cooperating elements coupled with multiple laterally spaced accessory motion restraints is particularly effective in inhibiting lateral movement and rotation of the accessory body relative to the channel element when the accessory body is received by the channel element.

In certain embodiments utilizing protrusions for restraining movement of an accessory, at least a portion of each protrusion may include a generally conical or frustoconical shape. Such a configuration facilitates smooth insertion and removal of a protrusion into a corresponding recess or aperture. In alternative embodiments, protrusions of any desired shape may be used, including horizontal cross-sectional shapes such as round, oval, rectangular, hexagonal, or trapezoidal. In certain embodiments, each protrusion may include multiple side wall segments divided by vertical gaps, with the side wall segments bounding a hollow interior. Such configuration permits the side wall segments to flex inward when the protrusions are inserted into and removed from corresponding apertures.

FIG. 1 illustrates a portion of a vehicle interior 10 including a channel element 30 of an accessory attachment system according to one embodiment of the present disclosure. The vehicle interior 10 includes a passenger side footwell area 14 and a driver side foot well area 12. The driver side foot well area 12 contains vehicle control pedals 16, with a steering column 18 arranged generally above the driver side foot well area. A dashboard portion 20 and a center console 22 are positioned generally between driver and passenger areas of the vehicle interior 10. The channel element 30 is arranged on the center console 22 approximately at a level of a driver side knee panel 24. A storage recess 26 is provided atop the center console 22 generally behind the channel element 30. The channel element 30 includes a rear wall 32, a shelf 36, and an upper wall 38. The rear wall 32 may be substantially vertical. The shelf 36 is arranged along a lower boundary of, and extends forward relative to, the rear wall 32. The shelf 36 may be substantially horizontal, or may be angled slightly downward in a direction from the rear wall 32 toward a forward edge of the shelf 36. A lower lip 37 extends generally downward along a forward edge of the shelf 36. Multiple spaced-apart triangular braces or gussets 34 are provided along a boundary between the shelf 36 and the rear wall 32. Preferably, the braces or gussets 34 have a depth shorter than a depth of the shelf 36, and have a height substantially smaller than a height of the rear wall 32. The upper wall 38 is arranged along an upper boundary of, and extends forward relative to, the rear wall 32. Although not shown in FIG. 1, the upper wall 38 preferably includes multiple laterally spaced accessory motion restraints configured to cooperate with one or more motion restraint cooperating elements to inhibit lateral movement and rotation of a body of an accessory, as will be described hereinafter. Forwardly extending lateral end walls 39 may be provided along lateral ends of the rear wall 32, and may extend in a generally vertical direction between the upper wall 38 and the shelf 36.

Although FIG. 1 illustrates a channel element mounted in a center console of an interior of a road vehicle (such as a truck or tractor vehicle), it is to be appreciated that one or more channel elements as described herein may be mounted or arranged at any suitable location in any type of vehicle, such as within a sleeper compartment of a truck or tractor vehicle, within a cabin of a farm or construction vehicle, within the interior of a motor home, within the interior of an aircraft or train, or in or on a passenger area of a boat. In certain embodiments, a channel element as disclosed herein may be mounted in an environment other than a vehicle interior, such as within a physical therapy, exercise, or hospital facility (e.g., proximate to a hospital bed).

Figure 2:
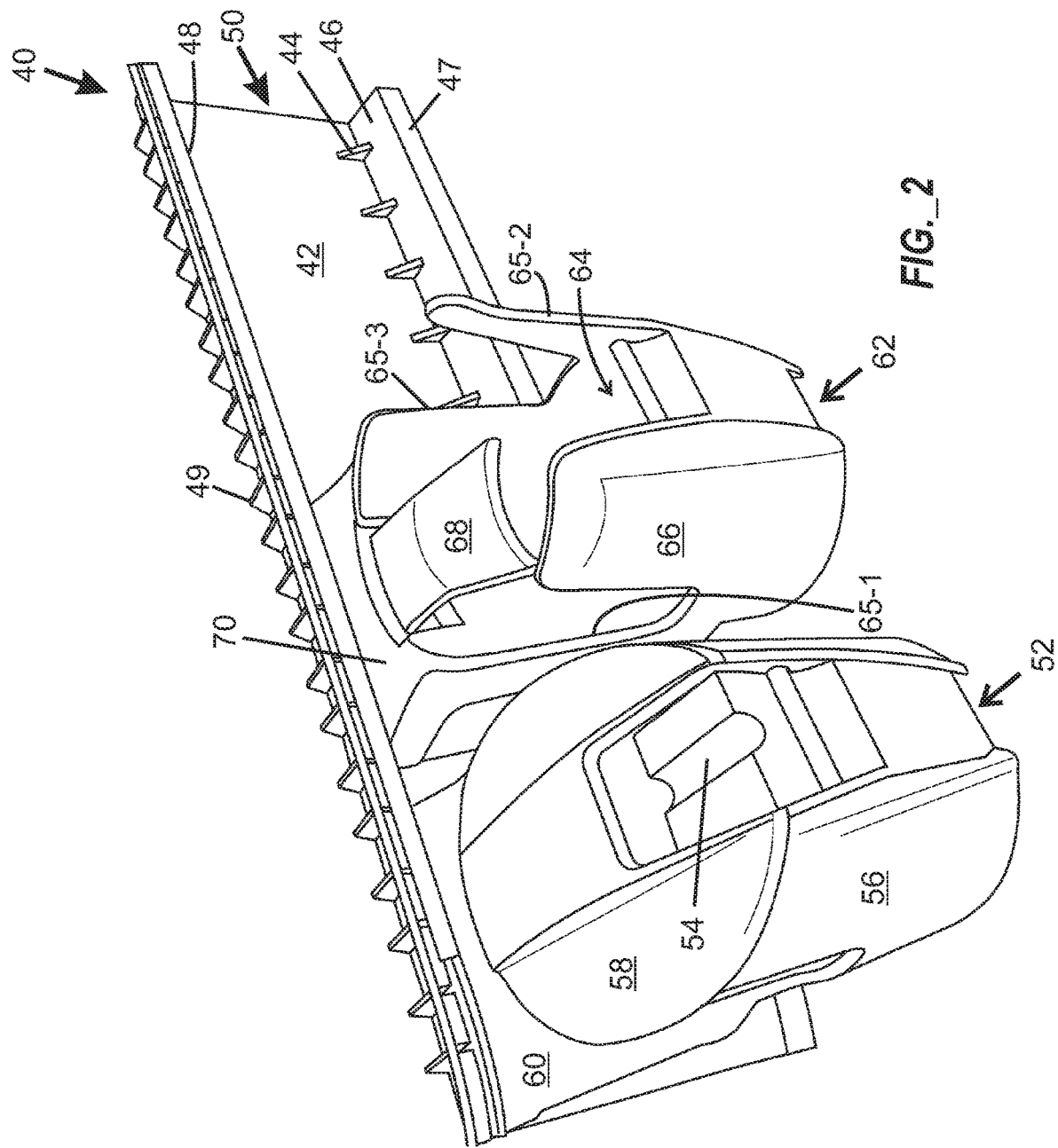
FIG. 2 is an upper perspective view of an accessory attachment system including a first grouping of two accessories (namely, an ashtray and a cupholder) received by a channel element according to an embodiment of the present disclosure.

FIG. 2 illustrates an accessory attachment system including an ashtray accessory 52 and a cupholder accessory 62 received by a channel element 40 according to an embodiment of the present disclosure. The channel element 40 is similar to the channel element 30 described in connection with FIG. 1. The channel element 40 includes a rear wall 42, a forwardly extending shelf 46, and an upper wall 48. A downwardly extending lower lip 47 is arranged along a forward edge of the shelf 46. Multiple spaced triangular braces or gussets 44 are provided along a boundary between the shelf 46 and the rear wall 42. Upwardly extending trapezoidal stiffening elements 49 are provided along a top surface of the upper wall 48. The upper wall 48, the rear wall 42, and the shelf 46 of the channel element 40 define a generally horizontal, forward-facing channel 50 arranged to receive portions of body 60 of the ashtray accessory 52 and body 70 of the cupholder accessory 62. The ashtray accessory 52 includes a cigarette holder 54 as well as a generally cylindrical lateral wall 56 and a removable lid 58 bounding an internal cavity. The body 60 is provided along a rear portion of the ashtray accessory, wherein at least a portion of the body 60 is received within the channel 50. The cupholder accessory 62 includes a generally cylindrical sidewall 66 defining left, front, and right cutout portions 65-1, 65-2, 65-3 and bounding a generally cylindrical recess 64. The cutout portions 65-1, 65-2, 65-3 are arranged to receive a cup handle (such as a handle of an insulated travel mug) when a cup is received by the generally cylindrical recess 64. An angled spring tab 68 extends generally forwardly and downwardly from an upper portion of the body 70 into the generally cylindrical recess 64 in order to exert a biasing force on a cup or can (not shown) when contained therein.

Figure 3:
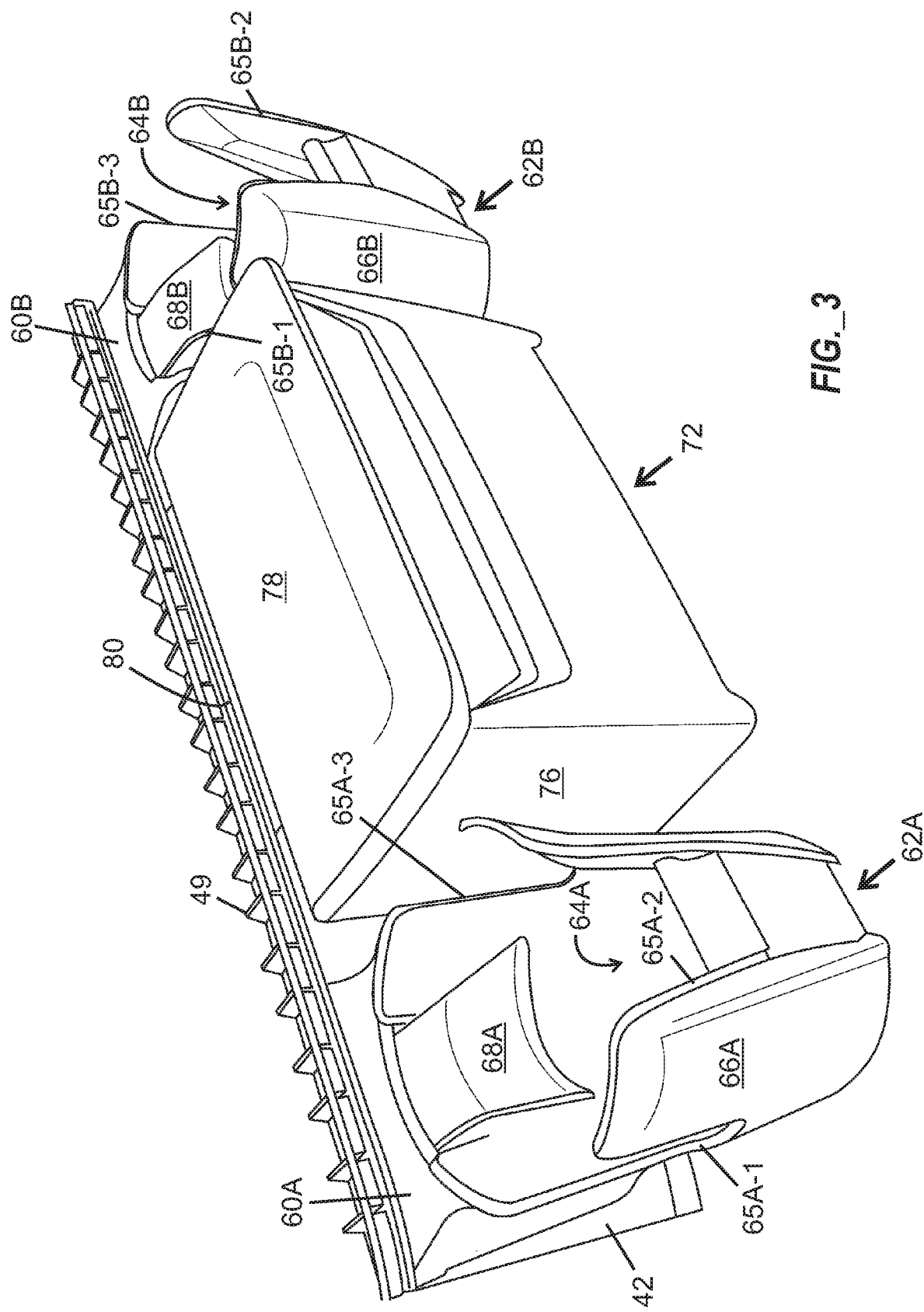
FIG. 3 is an upper perspective view of an accessory attachment system including a second grouping of three accessories (namely, two cupholders and a storage box) received by a channel element according to an embodiment of the present disclosure.

FIG. 3 illustrates an accessory attachment system including a storage box accessory 72, a first cupholder accessory 62A, and a second cupholder accessory 62B received by a channel element 40 according to an embodiment of the present disclosure. The channel element 40 is the same as described in connection with FIG. 2, and each cupholder accessory 62A, 62B is substantially the same as the cupholder accessory 62 described in connection with FIG. 2. Each cupholder accessory 62A, 62B includes a body 60A, 60B, a spring tab 68A, 68B, and a generally cylindrical sidewall 66A, 66B defining left, front, and right cutout portions 65A-1, 65B-1, 65A-2, 65B-2, 65A-3, 65B-3 and bounding a generally cylindrical recess 64A, 64B. The storage box accessory 72 includes lateral walls 76 and a pivotally movable hinged lid 78 bounding a hollow interior, with a body 80 arranged along a rear surface. The channel element 40 defines a generally horizontal, forward-facing channel arranged to receive portions of bodies 60A, 60B, 80 of the first cupholder accessory 62A, the second cupholder accessory 62B, and the storage box 72, respectively.

Figure 4:
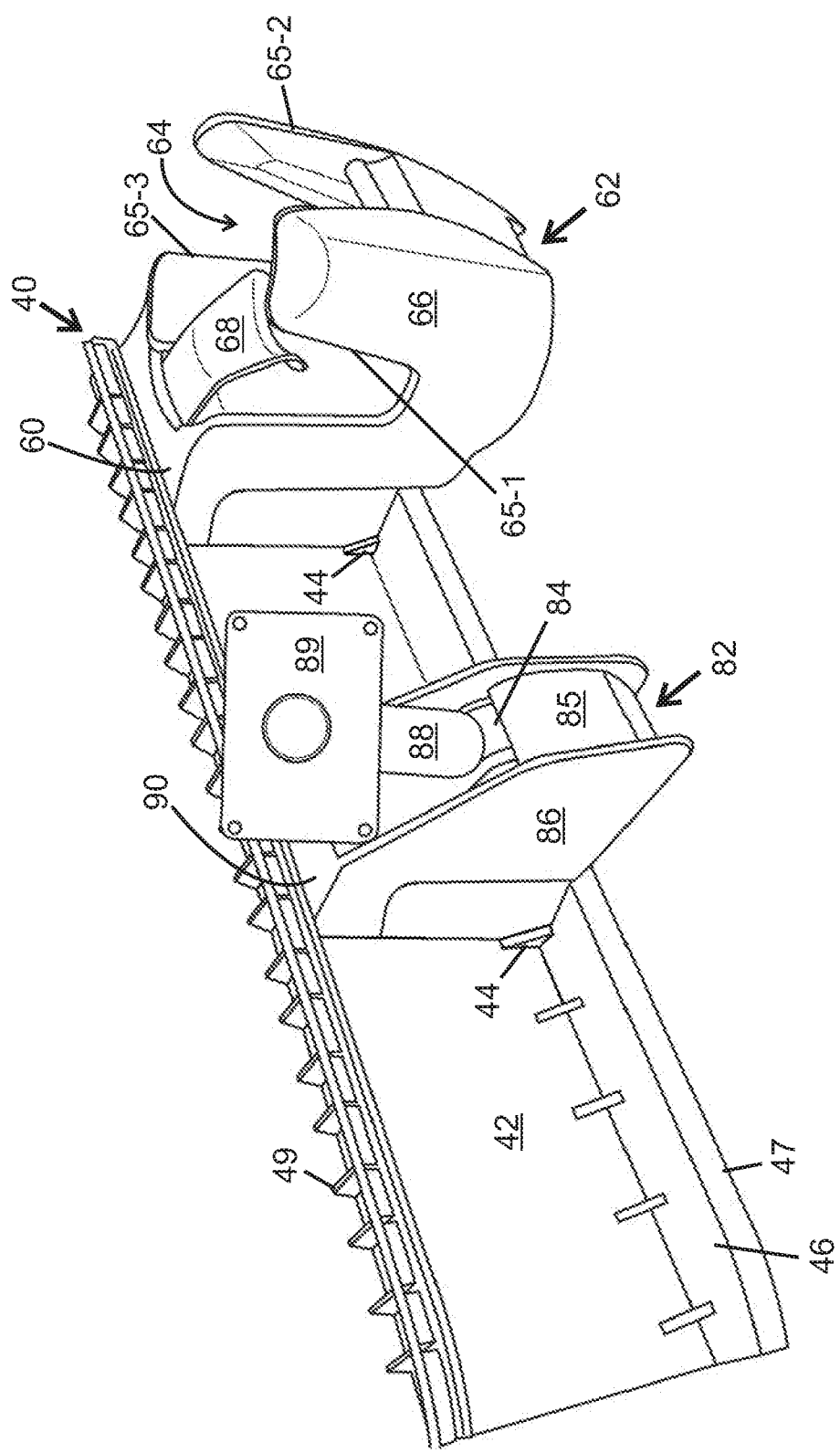
FIG. 4 is an upper perspective view of an accessory attachment system including a third grouping of two accessories (namely, a cupholder and a mount for a portable electronic device) received by a channel element according to an embodiment of the present disclosure.

FIG. 4 illustrates an accessory attachment system including a cupholder accessory 62 and a portable electronic device mount accessory 82 received by a channel element 40 according to an embodiment of the present disclosure. The channel element 40 and the cupholder accessory 62 are the same as described in connection with FIG. 2. The portable electronic device mount accessory 82 includes a front wall 85, lateral walls 86, a pivot joint 84, a support post 88 extending generally upward from the pivot joint 84, and a mounting plate 89 supported by an upper end of the support post 88. The mounting plate 89 is arranged to receive and support a portable electronic device (not shown) such as a GPS receiver, a smartphone, a tablet computer, or the like. As shown in FIG. 4, a side portion of each body 60, 90 is arranged in contact with at least one triangular brace or gusset 44, and a rear portion of each body 60, 90 is arranged in contact with the rear wall 42.

Figure 5:
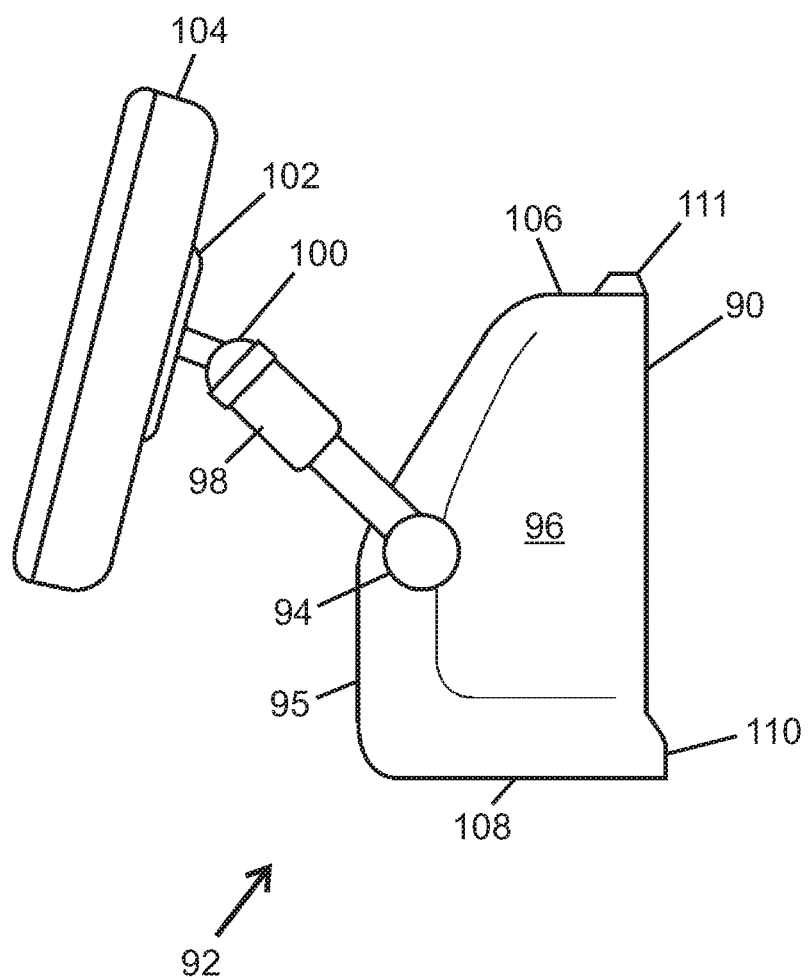
FIG. 5 is a side elevation view of an accessory (namely, a mount for a portable electronic device) suitable to be received by a channel element according to an embodiment of the present disclosure.

FIG. 5 is a side elevation view of a portable electronic device mount accessory 92 suitable to be received by a channel element according to an embodiment of the present disclosure. The portable electronic device mount accessory 92 includes a front wall 95, side walls 96, and a body 90 extending between a top wall 106 and a bottom wall 108. An upper portion of the front wall 95 slopes rearward toward the top wall 106. A rearwardly protruding rear extension 110 of the body 90 is arranged proximate to the bottom wall 108. At least one restraint cooperating element 111 embodied in an upwardly extending frustoconical protrusion is arranged along the top wall 106 proximate to a rear surface of the body 90. The at least one restraint cooperating element 111 is configured to cooperate with at least one accessory motion restraint of a channel element, as will be described hereinafter. The portable electronic device mount accessory 92 further includes a centrally arranged pivot 94, a support post 98 extending upward and forward from the pivot 94, a rotatable joint 100 arranged at a proximal end of the support post 98, and a mounting plate 102 extending forward from the rotatable joint 100. A portable electronic device 104 is mounted to the mounting plate 102.

Suitable materials for fabricating channel elements and accessories as disclosed herein may include polymeric materials (optionally reinforced by fibers), composites, metals, and the like. In certain embodiments, acrylonitrile butadiene styrene (ABS), optionally reinforced with fibers, may be used. Channel elements and/or accessories may be unitary in character or assembled from multiple parts (e.g., utilizing adhesives, fasteners, and/or welding or brazing). A desirable fabrication technique includes injection molding, although other suitable fabrication techniques known in the art may be used.

Figure 6B:
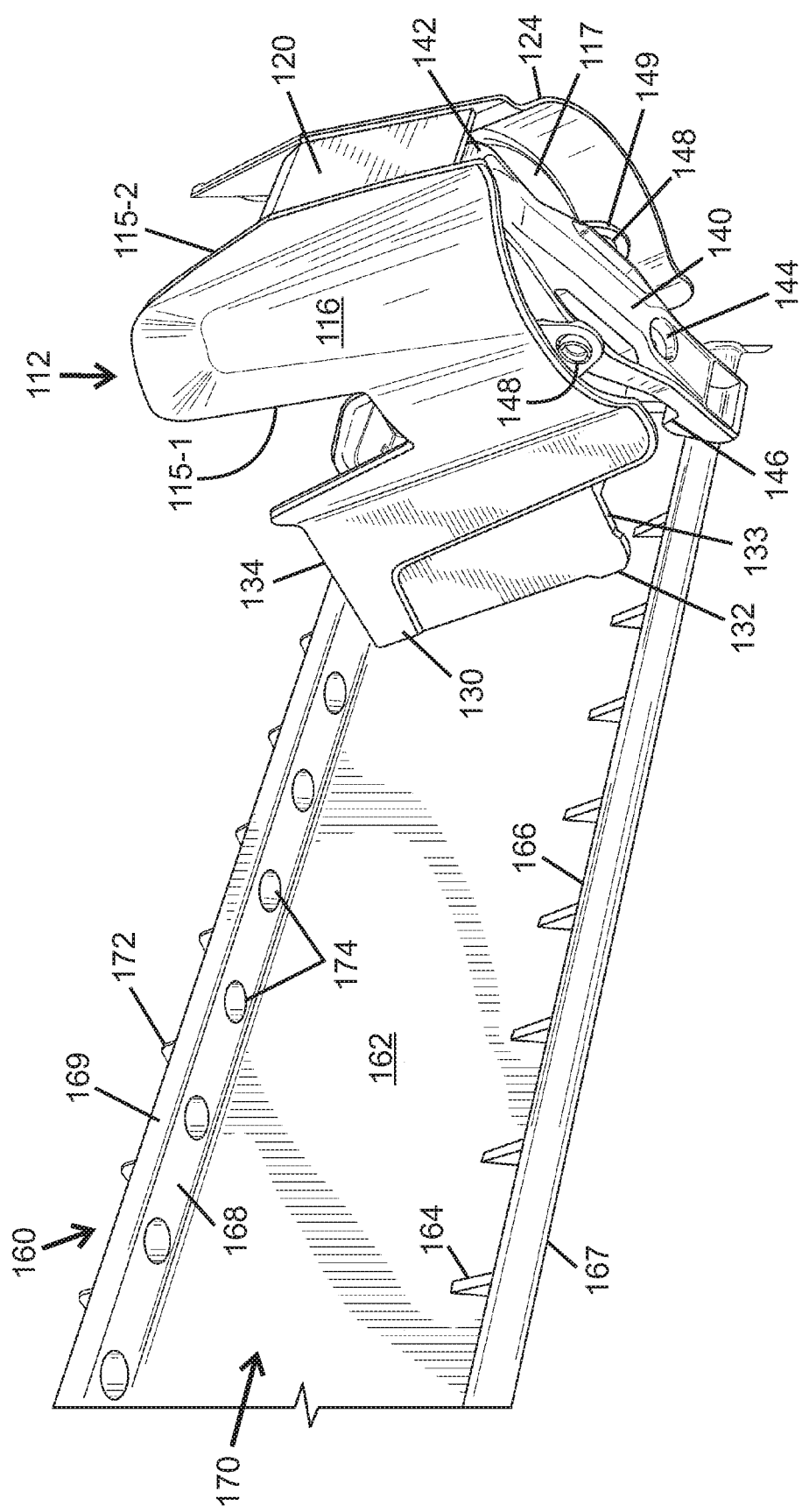
FIG. 6B is a lower perspective view of the cupholder accessory and the channel element of FIG. 6A with the cupholder accessory arranged in a pre-mounting position.

FIGS. 6A-6C provide three different perspective views of a cupholder accessory 112 together with a channel element 160 according to an embodiment of the present disclosure, with the cupholder accessory 112 in a pre-mounting position in FIGS. 6A-6B, and with the cupholder accessory 112 in a mounted position in FIG. 6C. The channel element 160 includes a rear wall 162, a forwardly extending shelf 166, and an upper wall 168. A downwardly extending lower lip 167 is arranged along a forward edge of the shelf 166. Multiple spaced triangular braces or gussets 164 are provided along a boundary between the shelf 166 and the rear wall 162 within a channel 170 bounded by the shelf 166, the rear wall 162, and the upper wall 168. An upwardly extending upper lip 169 is provided along a forward edge of the upper wall 168. The upper wall 168 defines multiple laterally spaced accessory motion restraints 174 embodied in apertures defined through the upper wall 168. Multiple upwardly extending trapezoidal stiffening elements 172 are arranged along a top surface of the upper wall 168, together with a laterally extending lattice-type support structure 176 defining collars surrounding the laterally spaced accessory motion restraints 174 and ribs contacting the trapezoidal stiffening elements 172. The trapezoidal stiffening elements 172 and the support structure 176 are provided to increase rigidity of the upper wall 168 without requiring the entire upper wall 168 to have an increased thickness.

Continuing to refer to FIGS. 6A-6C, the cupholder accessory 112 includes a front wall 120 terminating at a front lower edge 122, and includes a generally cylindrical sidewall 116. The sidewall 116 defines left, front, and right cutout portions 115-1, 115-2, 115-3 and bounds a generally cylindrical recess 114 arranged to receive a cylindrical cup or can. The cutout portions 115-1, 115-2, 115-3 are arranged to receive a cup handle (such as a handle of an insulated travel mug) when a cup is received by the generally cylindrical recess 114. An angled spring tab 118 extends generally forwardly and downwardly from an upper portion of a body 130 into the generally cylindrical recess 114 to exert a biasing force on a cup or can (not shown) when contained therein. The body 130 is arranged behind the recess 114 and extends between a top wall 134 and a bottom wall 133. A rearwardly protruding rear extension 132 of the body 130 is arranged proximate to the bottom wall 133. Two restraint cooperating elements 138 embodied in upwardly extending frustoconical protrusions are arranged along the top wall 134 proximate to a rear surface of the body 130. Each restraint cooperating element 138 includes multiple side wall segments that are separated by vertical gaps, with the side wall segments bounding a hollow interior. Such configuration permits the side wall segments to flex inward when the restraint cooperating elements 138 are inserted into, and removed from, corresponding apertures of the laterally spaced accessory motion restraints 174. The top wall 134 of the body 130 optionally includes a medially arranged raised alignment feature 136 that may be used to facilitate registration of the body 130 with corresponding alignment features (not shown) arranged along the upper lip 169 and/or the upper wall 168, since the laterally spaced accessory motion restraints 174 may not be visible when the channel element 160 is integrated or otherwise mounted within a vehicle interior. Referring to FIG. 6B, a lower edge 124 of the sidewall 116 is arranged at a level lower than the bottom wall 133 of the body 130. The lower edge 124 of the sidewall 116 extends downward past the front lower edge 112 of the front wall 120 and forms a peripheral skirt arranged to laterally surround a pivotally mounted spring-biased clasp element 140 arranged generally under a floor 117 bounding the recess 114. A front portion of the clasp element 140 includes a user-depressible lever actuating surface 142, and a rear portion of the clasp element 140 includes a hook element 146 configured to engage the lower lip 167 of the channel element 160 when the cupholder accessory 112 is received by the channel element 160. The lever actuating surface 142 is accessible below the floor 117 immediately behind the front lower edge 122 of the front wall 120. A medial portion of the clasp element 140 includes a pivot joint 148 supported by downwardly extending tabs 149 of the cupholder accessory 112. The clasp element 140 further includes a spring retention feature 144 containing a spring (not shown) arranged between the clasp element 140 and the floor 117 that bounds the recess 114 from below.

FIGS. 6A-6B show the cupholder accessory 112 arranged in a pre-mounting position, with the two restraint cooperating elements 138 registered with a corresponding pair of laterally spaced accessory motion restraints 174. To ready the cupholder accessory 112 for mounting to the channel element 160, a user manually depresses the lever actuating surface 142 in an upward direction to cause the clasp element 140 to pivot, thereby expanding a gap between the hook element 146 and the bottom wall 133 of the accessory body 130. At the same time, the user tilts an upper portion of the body 130 forward, registers the two restraint cooperating elements 138 with a corresponding pair of laterally spaced accessory motion restraints 174, and initiates contact between the restraint cooperating elements 138 and the accessory motion restraints 174. Thereafter, the user pushes the cupholder accessory 112 forward and tilts a lower portion of the body 130 forward to cause the hook element 146 to engage the lower lip 167 and to cause the two laterally spaced restraint cooperating elements 138 to engage a pair of accessory motion restraints 174, and the user releases upward pressure on the lever actuating surface 142. A biasing force exerted by the spring causes the hook element 146 to be pulled upward, thereby maintaining engagement between the hook element 146 and the lower lip 167. Use of the spring-biased clasp element 140 in combination with engagement between the restraint cooperating elements 138 and the accessory motion restraints 174 maintains the body 130 of the cupholder accessory 112 securely within the channel 170 of the channel element 160, in a manner sufficient to resist sliding and twisting in case the cupholder accessory 112 is subjected to forces caused by vehicular movement and/or jarring by a user. FIG. 6C shows the cupholder accessory 112 in a mounted position. If a user desires to remove and/or reposition the cupholder accessory 112, the user simply exerts upward pressure on the lever actuating surface 142, tilts a forward portion of the cupholder accessory 112 in a forwardly and upwardly direction while tilting the body 130 downward, and pulls the cupholder accessory 112 forward to remove the cupholder accessory 112 from the channel element 160.

FIGS. 7A-7C provide side elevation views of the cupholder accessory 112 and the channel element 160 of FIGS. 6A-6C, with the cupholder accessory 112 in three different positions. The side elevation views of the channel element 160 show that the channel element 160 includes a back surface 163 as well as spaced lower triangular braces or gussets 161 extending between the lower lip 167 and a bottom surface of the forwardly extending shelf 166. FIG. 7A shows the cupholder accessory 112 in a pre-mounting position, with actuation of the spring-biased clasp element 140 to expand a gap between the hook element 146 and a bottom wall 133 of the accessory body 130, and thereby ready the cupholder accessory 112 for mating with the channel element 160. FIG. 7A shows the cupholder accessory 112 with an upper portion of the body 130 tilted forward, and with the restraint cooperating elements 138 generally aligned or registered with corresponding laterally spaced accessory motion restraints 174. FIG. 7B shows the cupholder accessory 112 in a partially mounted position, following partial insertion of protrusions of the restraint cooperating elements 138 into apertures of the laterally spaced accessory motion restraints 174, but prior to engagement of the hook element 146 with the lower lip 167. FIG. 7C shows the cupholder accessory 112 in a mounted position, after a lower portion of the body 130 has been pressed forward into the channel 170 and the clasp element 140 has been released, to permit the hook element 146 to engage the lower lip 167. As shown in FIG. 7C, at least the rear extension 132 (which is hidden behind a gusset 164) of the body 130 is preferably arranged in contact with the rear wall 162 of the channel 170 when the cupholder accessory 112 is received by the channel element 160, while a lower portion of the sidewall 116 (arranged below the bottom wall 133 of the body 130) is arranged in contact with a forward surface of the lower lip 167.

Figure 10:
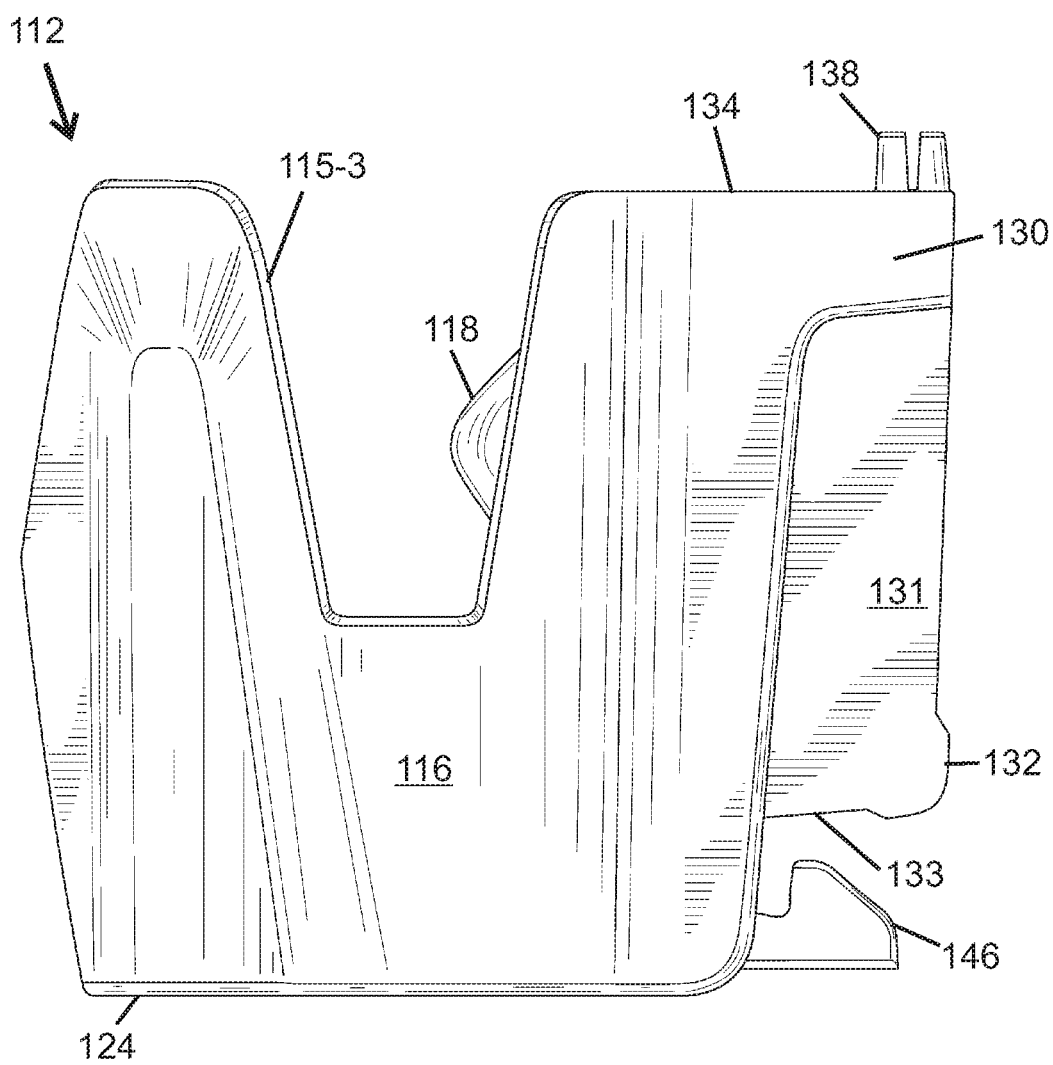
FIG. 10 is a right side elevation view of the cupholder accessory of FIGS. 8 and 9.
Figure 16:
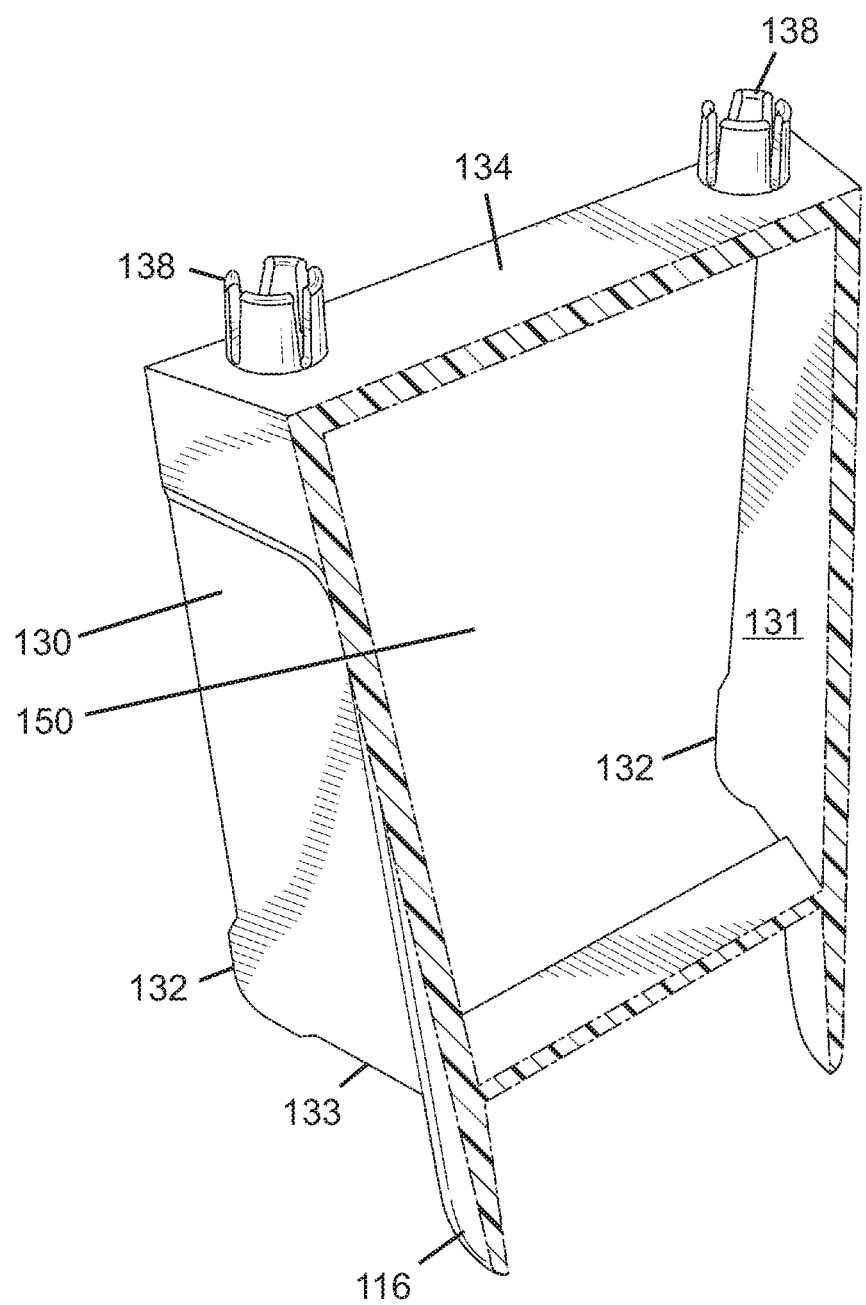
FIG. 16 is a perspective view of a rear body portion of an accessory suitable for use with a channel element of an accessory attachment system according to an embodiment of the present disclosure, with the body portion including multiple restraint cooperating elements.
Figure 20:
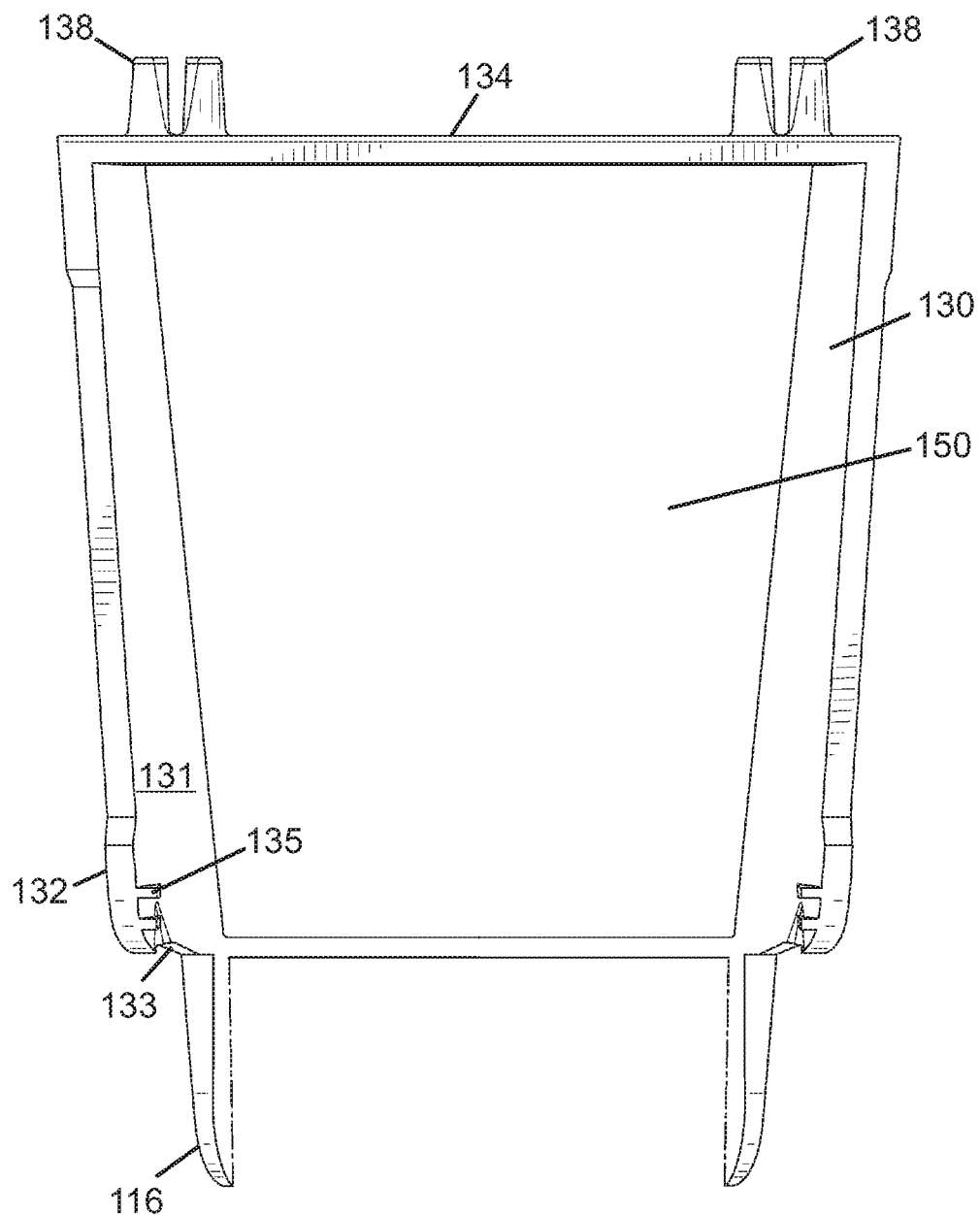
FIG. 20 is a rear elevation view of the accessory rear body portion of FIGS. 16-19.

FIGS. 8-15A provide additional views of the cupholder accessory 112 illustrated in FIGS. 6A-6C and 7A-7C. FIG. 8 is an upper front perspective view of the cupholder accessory 112 showing features described previously herein. FIG. 9 is a lower rear perspective view, and FIG. 13 is a rear elevation view, of the cupholder accessory 112. In addition to features described previously herein, FIGS. 9 and 13 show that the cupholder accessory 112 defines a rear cavity 150 within the body 130. The rear cavity 150 is approximately rectangular in shape with a width that narrows toward a front of the cupholder accessory 112. Within the rear cavity 150, horizontally arranged generally triangular stiffening elements 152 are arranged in contact with side walls 131 of the body 130 and the sidewall 116 of the cupholder accessory 112. A window 154 is also provided in the sidewall 116 between the recess 114 and the rear cavity 150. Additionally, a torsion spring 158 and pivot pin 156 are operatively coupled with the angled spring tab 118 to bias the spring tab 118 toward a medial portion of the recess 114. Within the rear cavity 150, each rearwardly protruding rear extension 132 of the body 130 has stiffening members 135 associated therewith. An upper spring retainer 147 extends downward from a floor 117 that bounds the recess 114 to retain a spring (not shown) also received by the spring retention feature 144 of the clasp element 140. FIGS. 10-12 provide right side elevation, left side elevation views, and front elevation views of the cupholder accessory 112, and FIG. 14 provides a top view of the cupholder accessory 112, showing features described previously herein.

FIG. 15A is a bottom plan view of the cupholder accessory 112, showing that the rear cavity 150 narrows in width in a direction toward a front of the cupholder accessory 112. FIG. 15A also shows the spring-biased clasp element 140 arranged generally under the floor 117, as well as the downwardly extending tabs 149 connected to the floor 117 and used to support the pivot joint 148. FIG. 15B is a magnified bottom plan view of a central portion of the cupholder accessory 112 illustrated in FIG. 15A, with contour lines omitted for clarity. The downwardly extending tabs 149 define first and second pivot recesses 145 arranged to receive convex pivot protrusions 143 formed along lateral edges of the clasp element 140. The convex pivot protrusions 143 and the first and second pivot recesses 145 are coaxially arranged with a pivot axis of the clasp element 140 to form the pivot joint 148 and thereby permit pivotal movement of the clasp element 140 (e.g., upon application of pressure to the lever actuating surface 142 to selectively enable expansion of a gap between the hook element 146 and the body 130).

Although FIGS. 6A-15B illustrate a cupholder accessory, it is to be appreciated that various features (e.g., body 130, restraint cooperating elements 138, clasp element 140, and the like) permitting such an accessory to be mounted to a channel element as disclosed herein (e.g., channel element 160) may be applied to any suitable type of accessory. FIGS.

16-22 illustrate a rear body portion of an accessory suitable for use with a channel element (e.g., channel element 160). The rear body portion includes a body 130 with side walls 131 extending between a top wall 134 and a bottom wall 133, and defining a rear cavity 150. A rearwardly protruding rear extension 132 of the body 130 is arranged proximate to the bottom wall 133. Within the rear cavity 150, each rearwardly protruding rear extension 132 of the body 130 has stiffening members 135 (shown in FIGS. 20 and 22) associated therewith. Two restraint cooperating elements 138 embodied in upwardly extending frustoconical protrusions are arranged along the top wall 134 proximate to a rear surface of the body 130. Each restraint cooperating element 138 includes multiple side wall segments that are separated by vertical gaps, with the side wall segments bounding a hollow interior. A portion of a sidewall 116 extends generally forward and downward relative to the body 130. The dot-dash lines bounding a forward edge of the rear body portion of FIGS. 16-22 represent an artificial (e.g., imaginary) boundary, since a practical accessory would include additional structure extending forward from the rear body portion. The rear body portion illustrated in FIGS. 16-22 may be generic to any suitable type of accessory, such as an ashtray, a storage container, a notepad, or a mount for a portable electronic device, etc.

Figure 23:
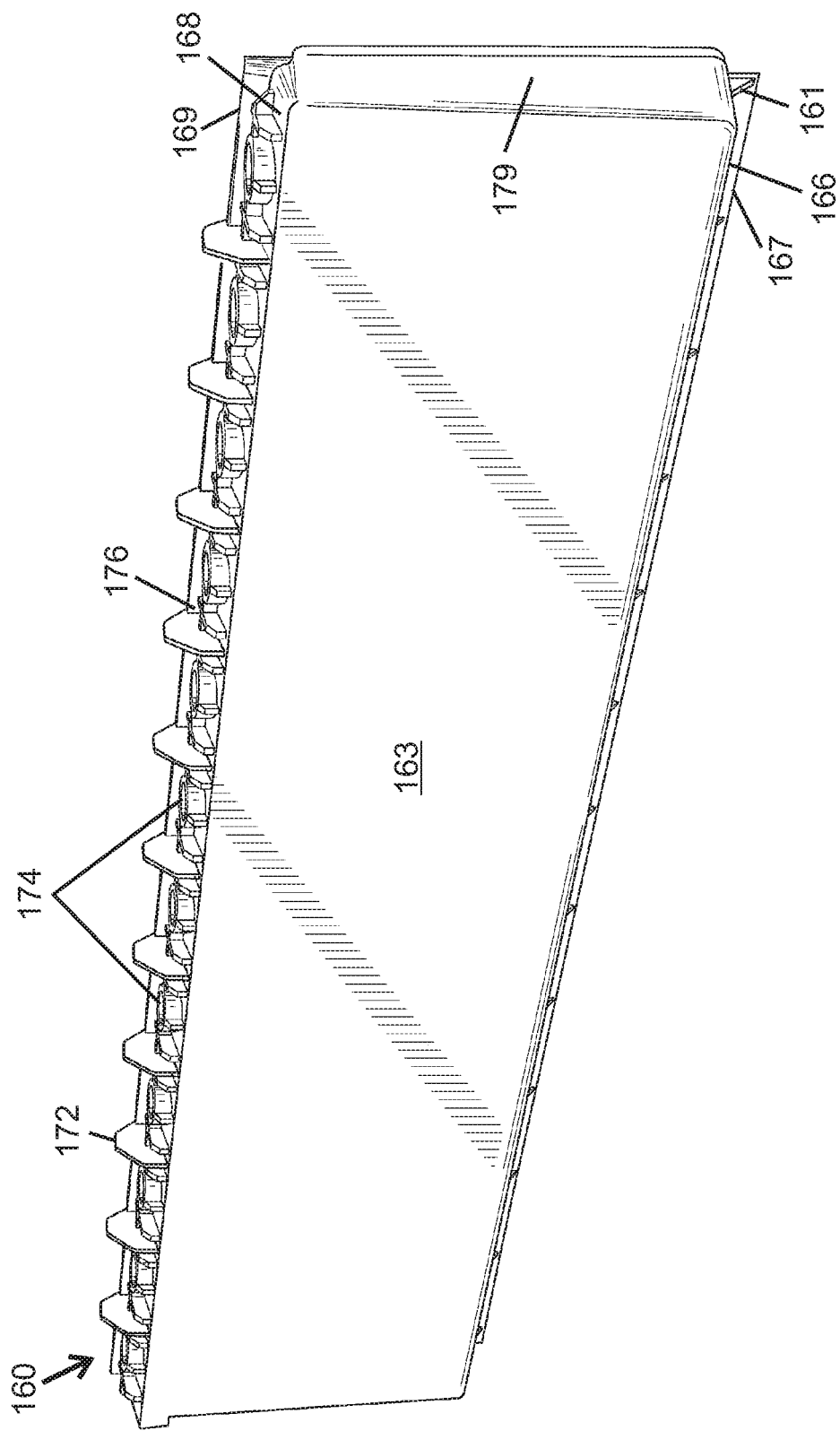
FIG. 23 is a rear perspective view of the channel element illustrated in FIGS. 6A-6C and 7A-7C.

FIG. 23 is a rear perspective view of the channel element 160 illustrated in FIGS. 6A-6C and 7A-7C. FIG. 23 shows that the channel element 160 includes a back surface 163 as well as spaced lower triangular braces or gussets 161 extending between the lower lip 167 and a bottom surface of the forwardly extending shelf 166. FIG. 23 also illustrates the multiple upwardly extending trapezoidal stiffening elements 172 arranged along a top surface of the upper wall 168, together with a laterally extending lattice-type support structure 176 including collars surrounding the laterally spaced accessory motion restraints 174 and ribs contacting the trapezoidal stiffening elements 172. The trapezoidal stiffening elements 172 and the support structure 176 increase rigidity of the upper wall 168. FIG. 23 also shows that the channel element 160 may include forwardly extending lateral end walls 179 disposed along lateral ends of the back surface 163 and extending in a generally vertical direction between the upper wall 168 and the shelf 166.

Figure 24:
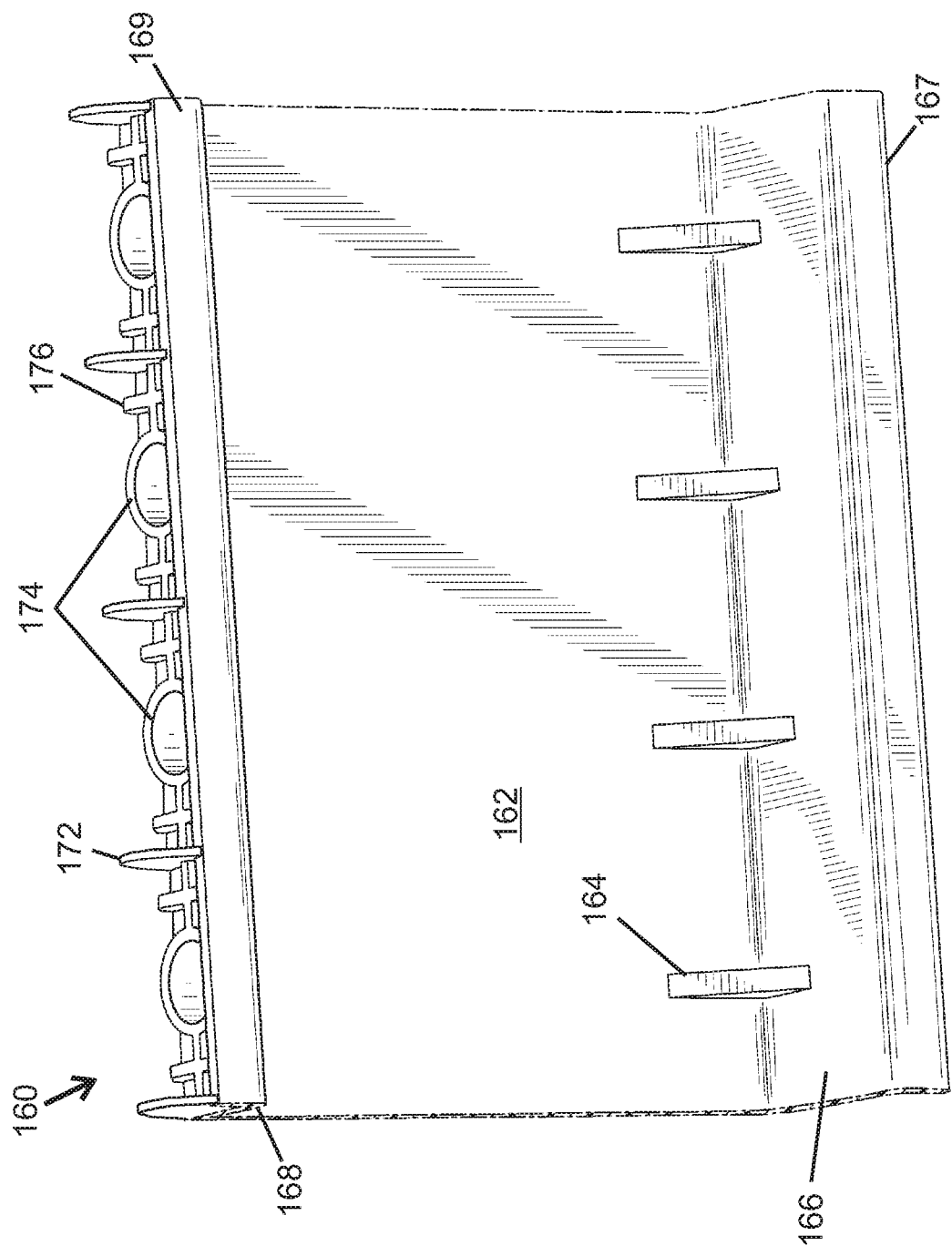
FIG. 24 is a front perspective view of a segment of a channel element of an accessory attachment system including multiple accessory motion restraints according to an embodiment of the present disclosure.
Figure 25:
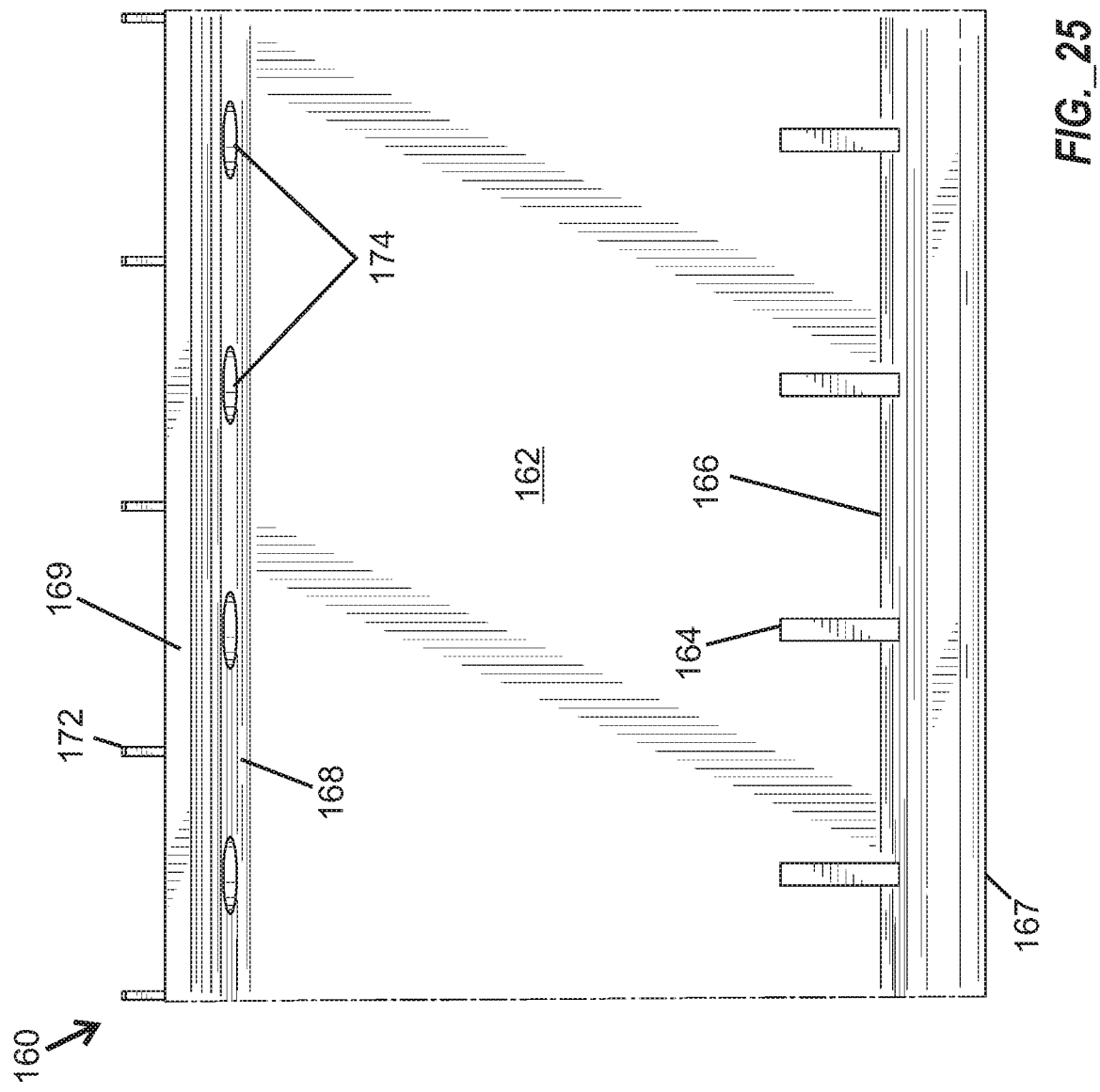
FIG. 25 is a front elevation view of the channel element segment of FIG. 24.
Figure 26:
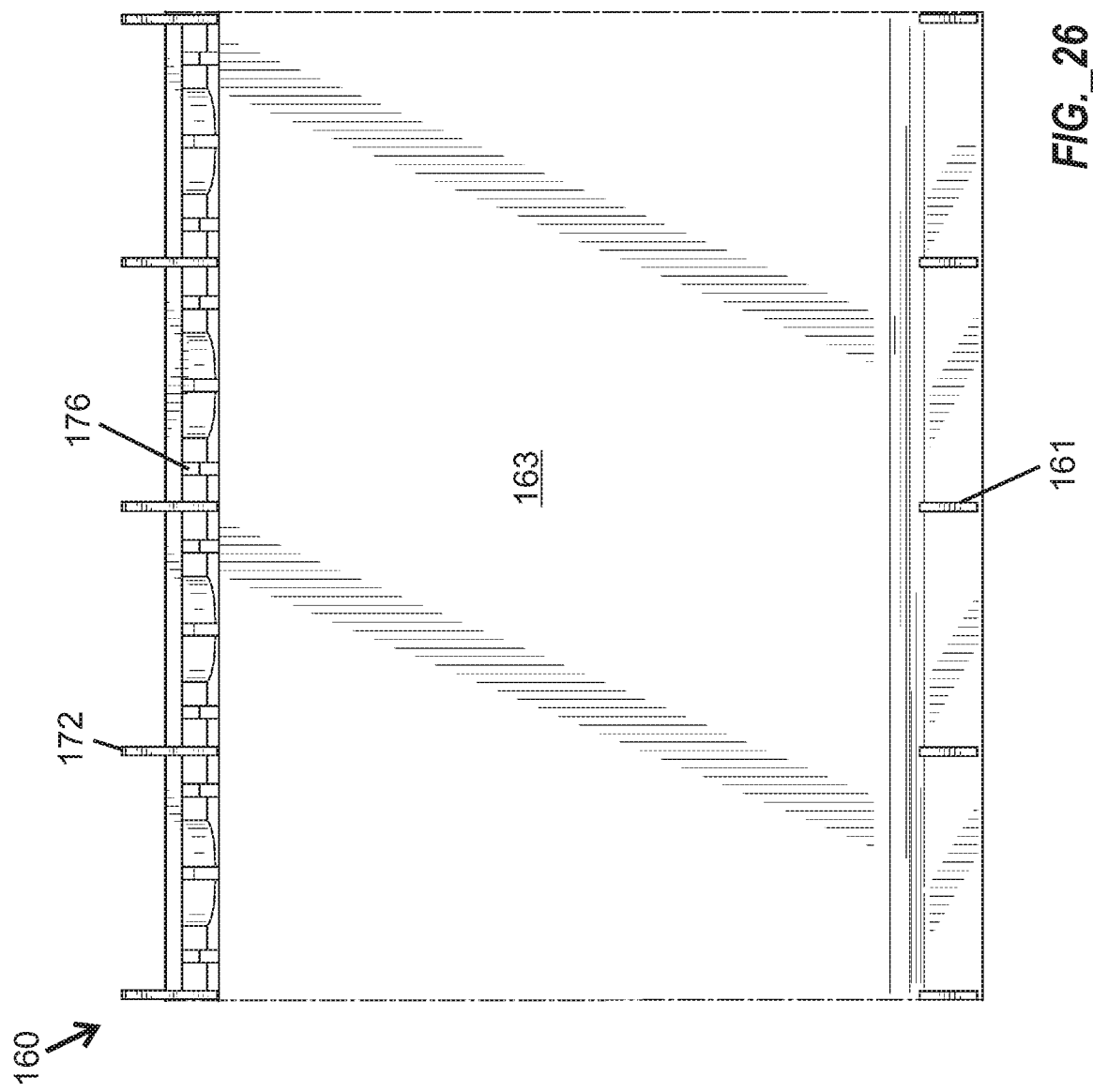
FIG. 26 is a rear elevation view of the channel element segment of FIGS. 24 and 25.

FIGS. 24-30 illustrate a segment of the channel element 160 illustrated in FIGS. 6A-6C, 7A-7C, and 23. FIG. 24 is a front perspective view, FIGS. 25-28 provide front, rear, right side, and left side elevation views, and FIGS. 29-30 provide top and bottom plan views, respectively. It is to be appreciated that a channel element 160 may be formed in any suitable length with any desirable number of multiple laterally spaced accessory motion restraints. The channel element 160 includes a rear wall 162, a forwardly extending shelf 166, and an upper wall 168. A downwardly extending lower lip 167 is arranged along a forward edge of the shelf 166. Multiple periodically spaced triangular braces or gussets 164 are provided along a boundary between the shelf 166 and the rear wall 162 within a channel 170 bounded by the shelf 166, the rear wall 162, and the upper wall 168. An upwardly extending upper lip 169 is provided along a forward edge of the upper wall 168. The upper wall 168 defines multiple laterally spaced accessory motion restraints 174 embodied in apertures defined through the upper wall 168. Multiple upwardly extending trapezoidal stiffening elements 172 are arranged along a top surface of the upper wall 168, together with a laterally extending lattice-type support structure 176 defining collars surrounding the laterally spaced accessory motion restraints 174 and ribs contacting the trapezoidal stiffening elements 172. The channel element 160 also includes a back surface 163 as well as periodically spaced lower triangular braces or gussets 161 extending between the lower lip 167 and a bottom surface of the forwardly extending shelf 166.

FIG. 31 is a side elevation view of a cupholder accessory 112A arranged in a pre-mounting position relative to a channel element 160A according to another embodiment, with the channel element 160A including accessory motion restraints 188 embodied in downwardly extending protrusions, and the cupholder accessory 112A including restraint cooperating elements 184 embodied in recesses defined in a top wall 134 of a body 130. The channel element 160A includes a rear wall 162 (having a back surface 163), a forwardly extending shelf 166, and an upper wall 168. A downwardly extending lower lip 167 is arranged along a forward edge of the shelf 166. Multiple periodically spaced triangular braces or gussets 164 are provided along a boundary between the shelf 166 and the rear wall 162 within a channel 170 bounded by the shelf 166, the rear wall 162, and the upper wall 168. The multiple laterally spaced accessory motion restraints 188 embody protrusions that extend downwardly from the upper wall 168, while multiple upwardly extending trapezoidal stiffening elements 172 are arranged along a top surface of the upper wall 168. The cupholder accessory 112A includes a generally cylindrical sidewall 116 defining multiple cutout portions (e.g., cutout portion 115-3) and bounds a generally cylindrical recess 114 arranged to receive a cylindrical cup or can (not shown). An angled spring tab 118 extends generally forwardly and downwardly from an upper portion of the body 130 into the generally cylindrical recess 114. The body 130 is arranged behind the recess 114 and extends between the top wall 134 and a bottom wall 133. A rearwardly protruding rear extension 132 of the body 130 is arranged proximate to the bottom wall 133. The restraint cooperating elements 184 embodied in downwardly extending recesses (or apertures) are defined in the top wall 134 proximate to a rear surface of the body 130, with each restraint cooperating element 184 being arranged to receive an accessory motion restraint 188 inserted therein when the cupholder accessory 112A is received by the channel element 160A. Arranged along a bottom of the cupholder accessory 112A is a pivotally mounted spring-biased clasp element 140 including a hook element 146 configured to engage the lower lip 167 of the channel element 160A when the cupholder accessory 112A is received by the channel element 160A.

While the invention has been described herein in reference to specific aspects, features, and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Various combinations and sub-combinations of the structures described herein are contemplated and will be apparent to a skilled person having knowledge of this disclosure. Any of the various features and elements as disclosed herein may be combined with one or more other disclosed features and elements unless indicated to the contrary herein. Correspondingly, the invention as hereinafter claimed is intended to be broadly construed and interpreted, as including all such variations, modifications and alternative embodiments, within its scope and including equivalents of the claims.

What is claimed is:

1. An accessory attachment system comprising:
   a channel element comprising a rear wall, a shelf extending forward relative to the rear wall, a lower lip extending generally downward from a leading edge of the shelf, and a plurality of laterally spaced accessory motion restraints located above the shelf; and
   an accessory arranged to be repositioned relative to the channel element, the accessory including an accessory body configured to be received by the channel element, wherein the accessory body comprises at least one restraint cooperating element and a pivotally mounted spring-biased clasp including a hook element configured to engage the lower lip when the accessory body is received by the channel element;
   wherein the at least one restraint cooperating element is configured to cooperate with one or more accessory motion restraints of the plurality of laterally spaced accessory motion restraints to inhibit lateral movement and rotation of the accessory body relative to the channel element when the accessory body is received by the channel element; and
   wherein the accessory attachment system comprises one of the following features (a) or (b):
   (a) the plurality of laterally spaced accessory motion restraints comprises a plurality of apertures or recesses defined in the channel element, and the at least one restraint cooperating element comprises a plurality of protrusions extending from a surface of the accessory body and arranged to be received by multiple apertures or recesses of the plurality of apertures or recesses; or
   (b) the plurality of laterally spaced accessory motion restraints comprises a plurality of protrusions extending from a surface of the channel element, and the at least one restraint cooperating element comprises multiple laterally spaced apertures or recesses defined in the accessory body and arranged to receive multiple protrusions of the plurality of protrusions.

2. The accessory attachment system of claim 1, wherein the channel element comprises an upper wall projecting forward from the rear wall, the plurality of laterally spaced accessory motion restraints is defined in or on the upper wall, and the at least one restraint cooperating element is arranged along a top surface of the accessory body.

3. The accessory attachment system of claim 2, wherein the upper wall, the rear wall, and the shelf of the channel element define a generally horizontal, forward-facing channel, and at least a portion of the accessory body is configured to be arranged within the channel when the accessory body is received by the channel element.

4. The accessory attachment system of claim 1, wherein the at least one restraint cooperating element comprises multiple laterally spaced restraint cooperating elements arranged to cooperate with multiple accessory motion restraints of the plurality of laterally spaced accessory motion restraints.

5. The accessory attachment system of claim 1, comprising feature (a) in the absence of feature (b).

6. The accessory attachment system of claim 5, wherein at least a portion of each protrusion of the multiple laterally spaced protrusions comprises a generally conical or frusto-conical shape.

7. The accessory attachment system of claim 1, comprising feature (b) in the absence of feature (a).

8. The accessory attachment system of claim 1, further comprising opposing first and second pivot recess elements arranged along a lower surface of the accessory body, wherein the first and second pivot recess elements are coaxially aligned with a pivot axis of the spring-biased clasp, and the spring-biased clasp comprises first and second pivot protrusions received by the first and second pivot recess elements, respectively, to permit pivotal movement of the spring-biased clasp.

9. The accessory attachment system of claim 1, wherein the pivotally mounted spring-biased clasp comprises a user-depressible lever actuating surface disposed along a front portion of a lower surface of the accessory.

10. The accessory attachment system of claim 1, wherein the accessory comprises one of the following items: a cupholder, an ashtray, a storage container, a notepad, or a mount for a portable electronic device.

11. The accessory attachment system of claim 1, wherein the channel element is configured to be affixed to or integrated with an interior of a motor vehicle.

12. An accessory configured for repositionable attachment to a channel element that includes a rear wall, a shelf extending forward from the rear wall, a lower lip extending generally downward from a leading edge of the shelf, and a plurality of accessory motion restraints which are laterally spaced in relation to one another and located above the shelf, the accessory comprising:
   an accessory body configured to be received by the channel element, wherein the accessory body comprises multiple laterally spaced restraint cooperating elements and a pivotally mounted spring-biased clasp that includes a hook element configured to engage the lower lip when the accessory body is received by the channel element;
   wherein the multiple laterally spaced restraint cooperating elements are configured to cooperate with multiple accessory motion restraints of the plurality of accessory motion restraints to inhibit lateral movement and rotation of the accessory body relative to the channel element when the accessory body is received by the channel element; and
   wherein the accessory comprises at least one of the following features (a) or (b):
   (a) the plurality of accessory motion restraints comprises a plurality of apertures or recesses defined in the channel element, and the multiple laterally spaced restraint cooperating elements comprise multiple laterally spaced protrusions extending from a surface of the accessory body and arranged to be received by multiple apertures or recesses of the plurality of apertures or recesses; or
   (b) the plurality of accessory motion restraints comprises a plurality of protrusions extending from a surface of the channel element, and the multiple laterally spaced restraint cooperating elements comprise multiple apertures or recesses defined in the accessory body and arranged to receive multiple protrusions of the plurality of protrusions.

13. The accessory of claim 12, wherein the multiple laterally spaced restraint cooperating elements are arranged along a top surface of the accessory body, and the plurality of accessory motion restraints are defined in or on an upper wall projecting forward from the rear wall of the channel element.

14. The accessory of claim 13, wherein the upper wall, the rear wall, and the shelf of the channel element define a generally horizontal, forward-facing channel, and at least a portion of the accessory body is configured to be arranged within the channel when the accessory body is received by the channel element.

15. The accessory of claim 12, comprising feature (a) in the absence of feature (b).

16. The accessory of claim 15, wherein at least a portion of each protrusion of the multiple laterally spaced protrusions comprises a generally conical or frustoconical shape.

17. The accessory of claim 12, comprising feature (b) in the absence of feature (a).

18. A method for removably attaching an accessory to a channel element including a rear wall, a shelf extending forward relative to the rear wall, a lower lip extending generally downward from a leading edge of the shelf, and a plurality of laterally spaced accessory motion restraints which are laterally spaced in relation to one another and located above the shelf, the accessory including multiple laterally spaced restraint cooperating elements, an accessory body, and a pivotally mounted spring-biased clasp including a hook element, the method comprising:

actuating the pivotally mounted spring-biased clasp to expand a gap between the hook element and the accessory body;

tilting an upper portion of the accessory body forward and registering the multiple laterally spaced restraint cooperating elements with multiple accessory motion restraints of the plurality of laterally spaced accessory motion restraints; and tilting a lower portion of the accessory body forward to cause the hook element to engage the lower lip and to cause the multiple laterally spaced restraint cooperating elements to engage the multiple accessory motion restraints;

wherein one of the following features (a) or (b) is provided:

(a) the plurality of laterally spaced accessory motion restraints comprises a plurality of apertures or recesses defined in the channel element, and the at least one restraint cooperating element comprises a plurality of protrusions extending from a surface of the accessory body and arranged to be received by multiple apertures or recesses of the plurality of apertures or recesses; or (b) the plurality of laterally spaced accessory motion restraints comprises a plurality of protrusions extending from a surface of the channel element, and the at least one restraint cooperating element comprises multiple laterally spaced apertures or recesses defined in the accessory body and arranged to receive multiple protrusions of the plurality of protrusions.

19. The method of claim 18, wherein:

the channel element comprises an upper wall projecting forward from the rear wall;

the upper wall, the rear wall, and the shelf of the channel element define a generally horizontal, forward-facing channel; and said forward tilting of the lower portion of the accessory body causes at least a portion of the accessory body to be arranged within the channel with a surface of the accessory body in contact with the rear wall.

20. The method of claim 19, wherein the plurality of laterally spaced accessory motion restraints is defined in or on the upper wall, and the multiple laterally spaced restraint cooperating elements are arranged along a top surface of the accessory body.

21. The method of claim 18, wherein feature (a) is provided in the absence of feature (b).

22. The method of claim 18, wherein feature (b) is provided in the absence of feature (a).

\* \* \* \* \*